(12) United States Patent
Schoolcraft

(10) Patent No.: US 9,644,721 B2
(45) Date of Patent: May 9, 2017

(54) SPLIT POWER INFINITELY VARIABLE TRANSMISSION ARCHITECTURE INCORPORATING A PLANETARY TYPE BALL VARIATOR WITH MULTIPLE FIXED RANGES AND LOW VARIATOR LOAD AT VEHICLE LAUNCH

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 203 days.

(21) Appl. No.: 14/517,364

(22) Filed: Oct. 17, 2014

(65) Prior Publication Data

US 2016/0109001 A1    Apr. 21, 2016

(51) Int. Cl.
*F16H 37/08* (2006.01)
*F16H 37/02* (2006.01)
(Continued)

(52) U.S. Cl.
CPC ......... *F16H 37/022* (2013.01); *F16H 37/086* (2013.01); *F16H 61/686* (2013.01); *F16H 3/66* (2013.01); *F16H 15/28* (2013.01); *F16H 2037/0873* (2013.01); *F16H 2037/0893* (2013.01); *F16H 2200/2012* (2013.01);
(Continued)

(58) Field of Classification Search
None
See application file for complete search history.

(56) References Cited

U.S. PATENT DOCUMENTS 2,347,873 A   5/1944  Bloomfield
2,410,818 A   11/1946 Grant
(Continued)

FOREIGN PATENT DOCUMENTS

DE   102007013493 A1   9/2008
DE   102012216277 A1   3/2014
(Continued)

OTHER PUBLICATIONS

International Search Report and Written Opinion received for PCT International Application No. PCT/US2013/045580, completed Oct. 27, 2013, 3 pages.
(Continued)

*Primary Examiner* — Justin Holmes
(74) *Attorney, Agent, or Firm* — Barnes & Thornburg LLP

(57) ABSTRACT

A transmission includes an input shaft, an output shaft, a variable-ratio unit, and a plurality of torque transmitting mechanisms. The plurality of torque transmitting mechanisms include a first clutch, a second clutch, a third clutch, and a fourth clutch. The transmission is operable to (i) engage the first clutch and the second clutch in a first operating mode and (ii) engage the first clutch and the third clutch in a second operating mode. The transmission is further operable to (i) engage the fourth clutch and disengage the second clutch during a first period of time and (ii) engage the third clutch and disengage the fourth clutch during a second period of time following the first period of time to transition from the first operating mode to the second operating mode.

21 Claims, 17 Drawing Sheets

(51) Int. Cl.
*F16H 61/686* (2006.01)
*F16H 3/66* (2006.01)
*F16H 15/28* (2006.01)

(52) U.S. Cl.
CPC .............. *F16H 2200/2043* (2013.01); *F16H 2200/2046* (2013.01); *F16H 2200/2097* (2013.01); *F16H 2306/20* (2013.01)

(56) References Cited

U.S. PATENT DOCUMENTS

| | | |
|---|---|---|
| 2,554,221 A | 5/1951 | Stephenson et al. |
| 2,583,843 A | 1/1952 | Herrick |
| 2,596,654 A | 5/1952 | Clark et al. |
| 2,718,292 A | 9/1955 | Meilander et al. |
| 2,841,330 A | 7/1958 | Brewer et al. |
| 3,324,744 A | 6/1967 | Roper |
| 3,410,157 A | 11/1968 | Livezey |
| 3,432,016 A | 3/1969 | Vogt |
| 3,481,436 A | 12/1969 | Wilkowski |
| 3,631,741 A | 1/1972 | Kelbel |
| 4,004,473 A | 1/1977 | Pearce et al. |
| 4,107,776 A | 8/1978 | Beale |
| 4,114,478 A | 9/1978 | Clauss |
| 4,205,563 A | 6/1980 | Gorrell |
| 4,258,585 A | 3/1981 | Orshansky, Jr. et al. |
| 4,361,217 A | 11/1982 | Bieber et al. |
| 4,381,828 A | 5/1983 | Lunn et al. |
| 4,742,733 A | 5/1988 | Schreiner |
| 4,754,664 A | 7/1988 | Dick |
| 4,813,524 A | 3/1989 | Reik |
| 4,856,374 A | 8/1989 | Kreuzer |
| 4,950,208 A | 8/1990 | Tomlinson |
| 5,011,463 A | 4/1991 | Jarchow et al. |
| 5,062,050 A | 10/1991 | Petzold et al. |
| 5,152,726 A | 10/1992 | Lederman |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Weilant et al. |
| 5,653,322 A | 8/1997 | Vasa et al. |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,301,538 B1 | 10/2001 | Kirchhoffer et al. |
| 6,358,178 B1 | 3/2002 | Wittkopp |
| 6,394,925 B1 | 5/2002 | Wontner et al. |
| 6,460,671 B1 | 10/2002 | Karambelas et al. |
| 6,585,619 B2 | 7/2003 | Henzler |
| 6,588,559 B2 | 7/2003 | Blair |
| 6,672,442 B2 | 1/2004 | Kato et al. |
| 6,679,367 B2 | 1/2004 | Baker et al. |
| 6,719,659 B2 | 4/2004 | Geiberger et al. |
| 6,726,590 B2 | 4/2004 | Henzler et al. |
| 6,761,658 B1 | 7/2004 | Stettler, Jr. |
| 6,790,153 B2 | 9/2004 | Goto |
| 6,834,750 B2 | 12/2004 | Baker et al. |
| 6,846,257 B2 | 1/2005 | Baker et al. |
| 6,855,086 B2 | 2/2005 | Elser et al. |
| 6,949,045 B2 | 9/2005 | Wafzig et al. |
| 7,052,430 B2 | 5/2006 | Stevenson et al. |
| 7,189,182 B2 | 3/2007 | Stevenson et al. |
| 7,195,576 B2 | 3/2007 | Toyoda et al. |
| 7,204,337 B2 | 4/2007 | Wildfellner |
| 7,217,216 B2 | 5/2007 | Inoue |
| 7,219,569 B2 | 5/2007 | Jastrzembowski et al. |
| 7,326,146 B2 | 2/2008 | Miyata et al. |
| 7,347,801 B2 | 3/2008 | Guenter et al. |
| 7,407,459 B2 | 8/2008 | Greenwood et al. |
| 8,083,631 B2 | 12/2011 | Shiohara |
| 8,142,323 B2 | 3/2012 | Tsuchiya et al. |
| 8,152,673 B2 | 4/2012 | Yanay |
| 8,298,111 B2 | 10/2012 | Kato et al. |
| 8,298,112 B2 | 10/2012 | Takada |
| 8,303,448 B2 * | 11/2012 | Hiraoka ............... F16H 37/042 475/207 |
| 8,617,020 B2 | 12/2013 | Winter |
| 8,758,181 B2 | 6/2014 | Calvert |
| 8,845,477 B2 | 9/2014 | Koch et al. |
| 8,986,150 B2 | 3/2015 | Versteyhe et al. |
| 8,996,263 B2 | 3/2015 | Quinn, Jr. et al. |
| 9,133,924 B2 | 9/2015 | Schoolcraft |
| 9,163,705 B1 | 10/2015 | Hwang et al. |
| 2002/0005325 A1 | 1/2002 | Yamada |
| 2003/0051959 A1 | 3/2003 | Blair |
| 2003/0199353 A1 | 10/2003 | Bowen |
| 2003/0226415 A1 | 12/2003 | Baker et al. |
| 2004/0104096 A1 | 6/2004 | Genise |
| 2006/0025272 A1 | 2/2006 | Pelouch |
| 2006/0189435 A1 | 8/2006 | Flaig et al. |
| 2007/0272455 A1 | 11/2007 | Lang et al. |
| 2007/0287572 A1 | 12/2007 | Tabata et al. |
| 2008/0280722 A1 | 11/2008 | Phillips et al. |
| 2009/0118912 A1 | 5/2009 | Hugenroth et al. |
| 2009/0203486 A1 | 8/2009 | Murray |
| 2009/0253543 A1 | 10/2009 | Foster et al. |
| 2010/0069191 A1 * | 3/2010 | Swales .................. B60K 6/365 475/5 |
| 2010/0093479 A1 | 4/2010 | Carter et al. |
| 2010/0151984 A1 | 6/2010 | Viitasalo et al. |
| 2011/0111910 A1 | 5/2011 | Ideshio et al. |
| 2011/0144872 A1 | 6/2011 | Long et al. |
| 2011/0300983 A1 * | 12/2011 | Kurokawa ............. B60K 6/365 475/5 |
| 2012/0072084 A1 | 3/2012 | Stoller et al. |
| 2013/0018557 A1 | 1/2013 | Wilson et al. |
| 2013/0338888 A1 | 12/2013 | Long et al. |
| 2013/0338889 A1 | 12/2013 | Long et al. |
| 2013/0338893 A1 | 12/2013 | Long et al. |
| 2014/0038766 A1 | 2/2014 | Koch et al. |
| 2014/0262672 A1 | 9/2014 | Raszkowski et al. |
| 2014/0274540 A1 | 9/2014 | Schoolcraft |

FOREIGN PATENT DOCUMENTS

| | | |
|---|---|---|
| EP | 1519084 A2 | 9/2004 |
| EP | 2113056 A1 | 11/2009 |
| JP | 2007232125 A | 9/2007 |
| JP | 2008075706 A | 4/2008 |
| WO | 9849455 A2 | 11/1998 |
| WO | 2010048029 A2 | 4/2010 |
| WO | 2013095213 A1 | 6/2013 |
| WO | 2014039900 | 3/2014 |
| WO | 2014125050 | 8/2014 |

OTHER PUBLICATIONS

U.S. Appl. No. 61/660,666, filed Dec. 16, 2009, (31 pages).
Utility U.S. Appl. No. 14/517,400, filed Oct. 17, 2014.
Utility U.S. Appl. No. 14/517,374, filed Oct. 17, 2014.
Utility U.S. Appl. No. 14/517,380, filed Oct. 17, 2014.
Utility U.S. Appl. No. 14/517,410, filed Oct. 17, 2014.
Utility U.S. Appl. No. 14/517,426, filed Oct. 17, 2014.
Search Report and Written Opinion from the International Searching Authority for Application No. PCT/US2015/056009, dated Feb. 25, 2016, 13 pages.
Search Report and Written Opinion for Application No. PCT/US2015/055999, dated Dec. 4, 2015, 10 pages.
Search Report and Written Opinion for Application No. PCT/US2015/055996, dated Jan. 4, 2016, 7 pages.

(56) References Cited

OTHER PUBLICATIONS

Search Report and Written Opinion for Application No. PCT/US2015/055993, dated Jan. 6, 2016, 8 pages.
Search Report and Written Opinion for Application No. PCT/US2015/056003, dated Jan. 6, 2016, 8 pages.
Search Report and Written Opinion for Application No. PCT/US2015/056007, dated Jan. 28, 2016, 8 pages.

* cited by examiner

| REGIME | CLUTCHES APPLIED | | | | | | TRANSMISSION RATIO IN MODE | | | REGIME SHOWN IN FIG(S) |
|---|---|---|---|---|---|---|---|---|---|---|
| | C1 | C2 | C3 | C4 | C5 | C6 | MIN | FIXED | MAX | |
| MODE 1 | X | | | X | | | -0.536 | | 0.020 | 6,7 |
| LOCK 1 | X | | | X | | X | | -0.179 | | 8 |
| BYPASS 1-2 | X | | X | | | | | 0.000 | | 9 |
| MODE 2 | X | X | X | | | | 0.000 | | 0.185 | 10 |
| LOCK 2 | X | | X | | | X | | 0.119 | | 11 |
| SYNC 2-3 | X | X | X | | X | | | 0.185 | | 12 |
| MODE 3 | | X | X | | | X | 0.185 | | 0.600 | 13 |
| LOCK 3 | | X | | | X | | | 0.333 | | 14 |
| BYPASS 3-4 | | X | | X | | X | | 0.600 | | 15 |
| MODE 4 | | X | | X | | | 0.556 | | 1.800 | 16 |
| LOCK 4 | | X | | X | | X | | 1.000 | | 17 |

FIG. 5

SPLIT POWER INFINITELY VARIABLE TRANSMISSION ARCHITECTURE INCORPORATING A PLANETARY TYPE BALL VARIATOR WITH MULTIPLE FIXED RANGES AND LOW VARIATOR LOAD AT VEHICLE LAUNCH

TECHNICAL FIELD

The present disclosure relates generally to infinitely variable transmissions, and more particularly, to the architectures of infinitely variable transmissions including ratio varying units.

BACKGROUND

Continuously variable transmissions (CVTs) utilize a ratio varying unit (e.g., a "variator") to provide a continuous variation of transmission ratio rather than a series of predetermined ratios as provided in typical transmissions. The variator of a typical CVT is coupled between the transmission input and the transmission output via gearing and one or more clutches.

In one type of continuously variable transmission, referred to as an infinitely variable transmission (IVT), a zero output speed can be obtained independently of the rotational input speed provided to the transmission by the drive unit in a geared neutral mode. Infinitely variable transmissions may use a variator and a planetary gear train to direct power flow along multiple power paths. For instance, power may flow along a first path through the variator and along a second path through the planetary gear train. Power may also be recirculated to the variator, thereby increasing the load experienced by the variator during the operation of the infinitely variable transmission. Many current architectures for infinitely variable transmissions subject the variator to the entire power load recirculated through the infinitely variable transmission.

SUMMARY

According to one aspect of the present disclosure, a transmission includes an input shaft, an output shaft, a variable-ratio unit arranged between the input shaft and the output shaft, and a plurality of torque transmitting mechanisms arranged between the input shaft and the output shaft. The input shaft is configured to receive torque from a drive unit. The output shaft is configured to transmit torque to a load. The plurality of torque transmitting mechanisms include a first clutch, a second clutch, a third clutch, and a fourth clutch. The transmission is operable to (i) engage the first clutch and the second clutch in a first operating mode of the transmission and (ii) engage the first clutch and the third clutch in a second operating mode of the transmission. The transmission is further operable to (i) engage the fourth clutch and disengage the second clutch during a first period of time and (ii) engage the third clutch and disengage the fourth clutch during a second period of time following the first period of time to transition from the first operating mode to the second operating mode.

In some embodiments, the second period of time may immediately follow the first period of time. Additionally, in some embodiments, the transmission may be operable to engage the first clutch during the first period of time to define a fixed speed ratio between the input shaft and the output shaft during the first period of time. The transmission may be operable to receive a first plurality of input speeds at the input shaft, the transmission may be operable to provide a second plurality of output speeds at the output shaft, and one of the second plurality of output speeds may be equal to zero in the fixed speed ratio for the first plurality of input speeds.

In some embodiments, (i) the transmission may be operable to receive a first plurality of input speeds at the input shaft, (ii) the transmission may be operable to provide a second plurality of output speeds at the output shaft, (iii) the transmission may be operable to provide a first range of speed ratios between the first plurality of input speeds and the second plurality of output speeds in the first operating mode, and (iv) the first range of speed ratios may include a ratio in which one of the second plurality of output speeds is equal to zero for the first plurality of input speeds. The transmission may be operable to provide a second range of speed ratios between the first plurality of input speeds and the second plurality of output speeds in the second operating mode, and the second range of speed ratios may include a ratio in which one of the second plurality of output speeds is equal to zero for the first plurality of input speeds. The first range of speed ratios may overlap with the second range of speed ratios. In some embodiments, (i) the first range of speed ratios may include a plurality of negative speed ratios and a plurality of positive speed ratios, and (ii) the second range of speed ratios may include only the ratio and a plurality of positive speed ratios.

In some embodiments, the transmission may further include a first planetary gearset, a second planetary gearset, a third planetary gearset, and a fourth planetary gearset. Additionally, in some embodiments, the transmission may further include only a first planetary gearset, a second planetary gearset, a third planetary gearset, and a fourth planetary gearset.

According to another aspect of the present disclosure, a transmission includes an input shaft, an output shaft, a variable-ratio unit arranged between the input shaft and the output shaft, and a plurality of torque transmitting mechanisms arranged between the input shaft and the output shaft. The input shaft is configured to receive torque from a drive unit. The output shaft is configured to transmit torque to a load. The plurality of torque transmitting mechanisms includes a first clutch, a second clutch, a third clutch, and a fourth clutch. The transmission is operable to (i) engage the first clutch and the second clutch in a first operating mode of the transmission and (ii) engage the first clutch and the third clutch in a second operating mode of the transmission. The transmission is further operable to (i) engage the fourth clutch and disengage the second clutch to transition from the first operating mode to a third operating mode and (ii) engage the third clutch and disengage the fourth clutch to transition from the third operating mode to the second operating mode.

In some embodiments, the plurality of torque transmitting mechanisms may include a fifth clutch. The transmission may be operable to (i) engage the third clutch and the fifth clutch in a fourth operating mode of the transmission and (ii) engage the second clutch and the fifth clutch in a fifth operating mode of the transmission. The transmission may be operable to (i) engage the fourth clutch and disengage the third clutch to transition from the fourth operating mode to a sixth operating mode and (ii) engage the second clutch and disengage the fourth clutch to transition from the sixth operating mode to the fifth operating mode. The transmission may be operable to engage the fifth clutch when the fourth clutch is engaged and the third clutch is disengaged to define a fixed speed ratio between the input shaft and the output shaft. Additionally, in some embodiments, (i) the transmission may be operable to receive a first plurality of input speeds at the input shaft, (ii) the transmission may be operable to provide a second plurality of output speeds at the output shaft, (iii) the transmission may be operable to provide a first range of speed ratios between the first plurality of input speeds and the second plurality of output speeds in the fourth operating mode, (iv) the transmission may be operable to provide a second range of speed ratios between the first plurality of input speeds and the second plurality of output speeds in the fifth operating mode, and (v) the first range of speed ratios may overlap with the second range of speed ratios.

In some embodiments, the transmission may further include a first planetary gearset, a second planetary gearset, a third planetary gearset, and a fourth planetary gearset. Additionally, in some embodiments, the transmission may further include only a first planetary gearset, a second planetary gearset, a third planetary gearset, and a fourth planetary gearset. The transmission may further comprise a housing, and at least three of the clutches may be engageable to couple an element of one of the planetary gearsets to the housing.

According to another aspect of the present disclosure, a method for operating a transmission that includes an input shaft, an output shaft, a variable-ratio unit arranged between the input shaft and the output shaft, and a plurality of clutches arranged between the input shaft and the output shaft includes (i) engaging a first clutch and a second clutch in a first operating mode to transmit torque received at the input shaft from the input shaft to the output shaft in the first operating mode, (ii) engaging a fourth clutch and disengaging the second clutch to transition from the first operating mode to a second operating mode and to prevent torque received at the input shaft from being transmitted through the variable-ratio unit to the output shaft in the second operating mode, and (iii) engaging a third clutch and disengaging the fourth clutch to transition from the second operating mode to a third operating mode to transmit torque received at the input shaft from the input shaft to the output shaft in the third operating mode.

In some embodiments, the method may further include (i) operating the variable-ratio unit to output a first torque ratio in the first operating mode, (ii) adjusting the variable-ratio unit to change the torque ratio output from the variable-ratio unit in the second operating mode, and (iii) operating the variable-ratio unit to output a second torque ratio in the third operating mode that may be different from the first torque ratio.

According to another aspect of the present disclosure, a transmission is operable in a plurality of operating modes and comprises an input shaft, a plurality of planetary gearsets, a variable-ratio unit, and a plurality of torque-transmitting mechanisms. The input shaft is configured to receive torque from a drive unit and transmit the torque to an output shaft of the transmission. The plurality of planetary gearsets is arranged between the input shaft and the output shaft. Each one of the plurality of planetary gearsets includes a sun gear, a ring gear, a carrier, and a plurality of planet gears. The plurality of planetary gearsets includes a first planetary gearset and a second planetary gearset. The variable-ratio unit is operable to produce continuously-variable torque output, and the variable-ratio unit includes an input ring coupled to the input shaft and an output ring coupled to the sun gear of the first planetary gearset. The plurality of torque transmitting mechanisms includes a variator bypass clutch and a first clutch. The variator bypass clutch is engageable to bypass the variable-ratio unit to prevent continuously-variable torque output from being produced in at least one operating mode of the transmission. The first clutch is engageable to couple the output ring of the variable-ratio unit to the carrier of the second planetary gearset through the sun gear of the first planetary gearset.

In some embodiments, the transmission may comprise a transmission housing. The plurality of torque transmitting mechanisms may include a second clutch. The second clutch may be engageable to couple the ring gear of the first planetary gearset to the transmission housing to brake the ring gear of the first planetary gearset.

In some embodiments, the plurality of torque transmitting mechanisms may include a third clutch. The third clutch may be engageable to couple the sun gear of the second planetary gearset to the transmission housing to brake the sun gear of the second planetary gearset.

In some embodiments, the plurality of planetary gearsets may include a third planetary gearset. The sun gear of the third planetary gearset may be coupled to the carrier of the second planetary gearset. The plurality of torque transmitting mechanisms may include a fourth clutch. The fourth clutch may be engageable to couple the carrier of the third planetary gearset to the transmission housing to brake the carrier of the third planetary gearset.

In some embodiments, the plurality of planetary gearsets may include a fourth planetary gearset. The ring gear of the third planetary gearset may be coupled to the ring gear of the fourth planetary gearset. Each component of the fourth planetary gearset may be configured to rotate. The plurality of torque transmitting mechanisms may include a fifth clutch. The fifth clutch may be engageable to couple the carrier of the second planetary gearset to the carrier of the fourth planetary gearset through the sun gear of the third planetary gearset.

According to another aspect of the present disclosure, a transmission is operable in a plurality of operating modes and comprises an input shaft, a plurality of planetary gearsets, a variable-ratio unit, and a plurality of torque transmitting mechanisms. The input shaft is configured to receive torque from a drive unit and transmit the torque to an output shaft of the transmission. Each of the plurality of planetary gearsets includes a ring gear, a sun gear, a carrier, and a plurality of planet gears. The plurality of planetary gearsets includes a first planetary gearset, a second planetary gearset, and a third planetary gearset. The variable-ratio unit is operable to produce continuously-variable torque output. The plurality of torque transmitting mechanisms includes a first clutch, a second clutch, and a third clutch. The first clutch is engageable to couple the carrier of the first planetary gearset to a transmission housing to brake the carrier of the first planetary gearset. The second clutch is engageable to couple the sun gear of the second planetary gearset to the carrier of the third planetary gearset. The third clutch is engageable to couple the ring gear of the second planetary gearset to the transmission housing to brake the ring gear of the second planetary gearset. The first clutch and the second clutch are contemporaneously engaged in a first operating mode of the transmission. The first clutch and the third clutch are contemporaneously engaged in a second operating mode of the transmission. The variable-ratio unit is configured to output torque at a first ratio preventing a synchronous transition from the first operating mode of the transmission to the second operating mode of the transmission.

In some embodiments, the plurality of torque transmitting mechanisms may include a variator bypass clutch. The variator bypass clutch may be engageable to bypass the variable-ratio unit to prevent continuously-variable torque output from being produced in at least one operating mode of the transmission. The variable-ratio unit may include an input ring and an output ring. The variator bypass clutch may be engageable to couple the input ring to the output ring to bypass the variable-ratio unit. The transmission may output torque at a ratio varying within a defined range in each of the first and second operating modes.

In some embodiments, the plurality of planetary gearsets may include a fourth planetary gearset, and the plurality of torque transmitting mechanisms may include a fourth clutch. The fourth clutch may be engageable to couple the sun gear of the first planetary gearset to the carrier of the fourth planetary gearset. The third clutch and the fourth clutch may be contemporaneously engaged in a third operating mode of the transmission. The second clutch and the fourth clutch may be contemporaneously engaged in a fourth operating mode of the transmission. The variable-ratio unit may be configured to output torque at a second ratio preventing a synchronous transition from the third operating mode of the transmission to the fourth operating mode of the transmission. The transmission may output torque at a ratio varying within a defined range in each of the third and fourth operating modes.

In some embodiments, the carrier of the third planetary gearset may be coupled to the sun gear of the first planetary gearset. The fourth clutch may be engageable to couple the carrier of the third planetary gearset to the carrier of the fourth planetary gearset through the sun gear of the first planetary gearset. Each component of the fourth planetary gearset may be configured to rotate. The plurality of torque transmitting mechanisms may include a fifth clutch. The fifth clutch may be engageable to couple the sun gear of the third planetary gearset to the transmission housing to brake the sun gear of the third planetary gearset. The ring gear of the third planetary gearset may be coupled to the input shaft. The carrier of the fourth planetary gearset may be coupled to the output shaft.

According to another aspect of the present disclosure, a transmission comprises an input shaft, a plurality of planetary gearsets, a variable-ratio unit, and a plurality of torque transmitting mechanisms. The input shaft is configured to receive torque from a drive unit and transmit the torque to an output shaft of the transmission in a first operating mode and a second operating mode of the transmission. Each of the plurality of planetary gearsets includes a ring gear, a sun gear, a carrier, and a plurality of planet gears. The plurality of planetary gearsets includes a first planetary gearset, a second planetary gearset, and a third planetary gearset. The variable-ratio is operable to produce continuously-variable torque output. The plurality of torque transmitting mechanisms includes a first clutch, a second clutch, a third clutch, and a fourth clutch. The first clutch is engageable to couple the carrier of the first planetary gearset to a transmission housing to brake the carrier of the first planetary gearset. The second clutch is engageable to couple the sun gear of the second planetary gearset to the carrier of the third planetary gearset. The third clutch is engageable to couple the ring gear of the second planetary gearset to the transmission housing to brake the ring gear of the second planetary gearset. The fourth clutch is engageable to couple the carrier of the third planetary gearset to the transmission housing to brake the carrier of the third planetary gearset. The first clutch and the second clutch are contemporaneously engaged in a first operating mode of the transmission. The first clutch and the third clutch are contemporaneously engaged in a second operating mode of the transmission. The first clutch and the fourth clutch are contemporaneously engaged in a third operating mode of the transmission to effect a synchronous transition from the first operating mode to the second operating mode. Torque received by the input shaft from the drive unit is not transmitted to the output shaft in the third operating mode.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a table showing the various operating modes achievable by the infinitely variable transmission of FIG. 1 and the transmission ratios associated with each mode;

DETAILED DESCRIPTION OF THE DRAWINGS

Figure 1:
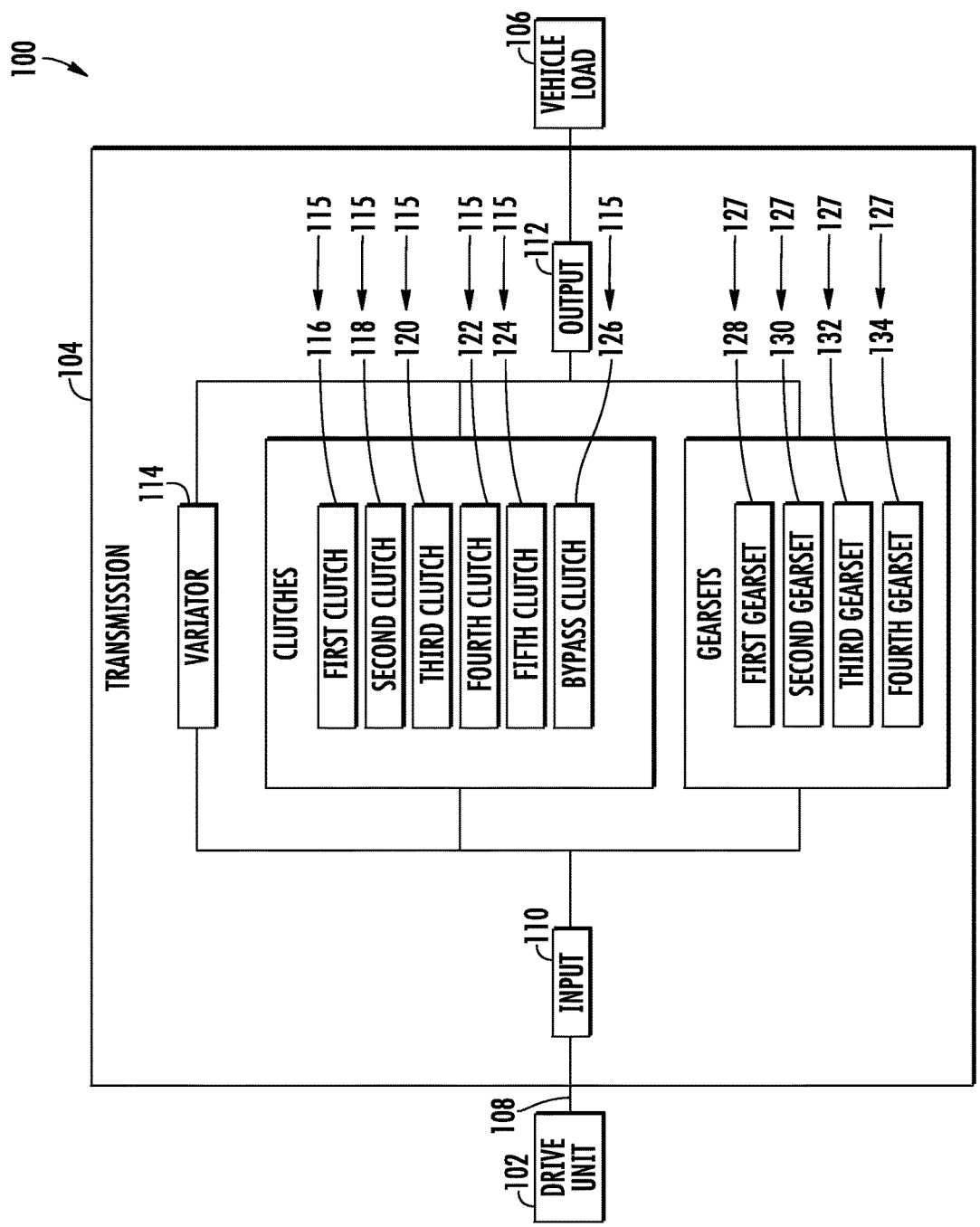
FIG. 1 is a simplified block diagram of an infinitely variable transmission including a variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 104. Additionally, the vehicle load 106 may be embodied as an auxiliary gearbox (e.g., a transfer case or drop box) or a power take-off device, such as a pump, mixer, lifter, shoveler, compressor, compactor, or blower.

In use, rotational power generated by the drive unit 102 is transmitted to the transmission 104 via a drive unit output shaft 108 included in the drive unit 102. The drive unit output shaft 108 is coupled to a transmission input shaft 110 included in the transmission 104. Additionally, rotational power received by the transmission 104 at the input shaft 110 is transmitted to a transmission output shaft 112 and therefrom to the vehicle load 106.

The transmission 104 ensures the controlled application of rotational power generated by the drive unit 102 to the vehicle load 106. The transmission 104, as discussed below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 110 to the transmission output shaft 112. Each operating mode enables at least one ratio of input speed (i.e., at the transmission input shaft 110) to output speed (i.e., at the transmission output shaft 112) to be achieved. As discussed below, operating modes of the transmission 104 in which a variator 114 is utilized enable a range of transmission ratios to be achieved whereas operating modes in which the variator 114 is not utilized enable only a single transmission ratio to be achieved.

The transmission 104 of FIG. 1 is illustratively embodied as an infinitely variable transmission. The transmission 104 includes the variator 114, a plurality of clutches 115, and a plurality of gearsets 127 in addition to the input shaft 110 and the output shaft 112. Illustratively, the plurality of clutches 115 includes a first clutch 116, a second clutch 118, a third clutch 120, a fourth clutch 122, a fifth clutch 124, and a variator bypass clutch 126. Additionally, the illustrative plurality of gearsets 127 includes a first gearset 128, a second gearset 130, a third gearset 132, and a fourth gearset 134.

The infinitely variable transmission 104 is operable, as discussed below, to split rotational power supplied from the drive unit 102 between the variator 114 and the plurality of gearsets 127. The transmission 104 is also operable, in at least one operating mode, to achieve zero output speed at the output shaft 112 in a mode referred herein to as a "geared neutral mode." The transmission 104 is further operable to recirculate rotational power directed toward the output shaft 112 back toward the input shaft 110 in multiple operating modes. As discussed below, power recirculated back toward the input shaft 110 and received by the variator 114 is reduced as a result of the architecture of the infinitely variable transmission 104. In this manner, the infinitely variable transmission 104 is similar to the infinitely variable transmission disclosed in U.S. Provisional Patent App. Ser. No. 61/798,476 entitled "SPLIT POWER INFINITELY VARIABLE TRANSMISSION ARCHITECTURE" by Brian Schoolcraft, the entirety of which is hereby incorporated by reference.

The variator 114, the plurality of clutches 115, and the plurality of gearsets 127 included in the transmission 104 are arranged between the input shaft 110 and the output shaft 112 of the transmission 104. Each of the gearsets included in the plurality of gearsets 127 may be supported by a mainshaft of the transmission 104 and may be capable of rotating freely and independently thereof. Each of the clutches may be selectively engaged to transmit power along a particular path between components included in the transmission 104 as discussed below.

Each of the plurality of clutches 115 included in the transmission 104 is embodied as a torque-transmitting device configured to define a torque transfer path between components included in the transmission 104. By selectively engaging each of the plurality of clutches 115 in combination with one another, the plurality of clutches 115 define a torque transfer path from the input shaft 110 to the output shaft 112 and thereby effect a change from one operating mode to another. In one example, one or more of the plurality of clutches 115 may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches 115 may be embodied as multi-plate wet clutches or controllable mechanical diodes, the engagement/disengagement of which are used to accomplish changes between operating modes. As discussed below, in the illustrative embodiment, the second clutch 118, the fourth clutch 122, and the variator bypass clutch 126 are rotating clutches while the first clutch 116, the third clutch 120, and the fifth clutch 124 are stationary, non-rotating clutches. Additionally, the variator bypass clutch 126, as discussed below, is engageable to lock a variator input ring 136 to a variator output ring 140 so that the variator 114 achieves a 1:1 ratio (i.e., variator input speed is equal to variator output speed). When the variator bypass clutch 126 is engaged, the power load experienced by the variator 114 is removed, and all the power transmitted to the variator 114 flows instead through the variator bypass clutch 126.

Figure 2:
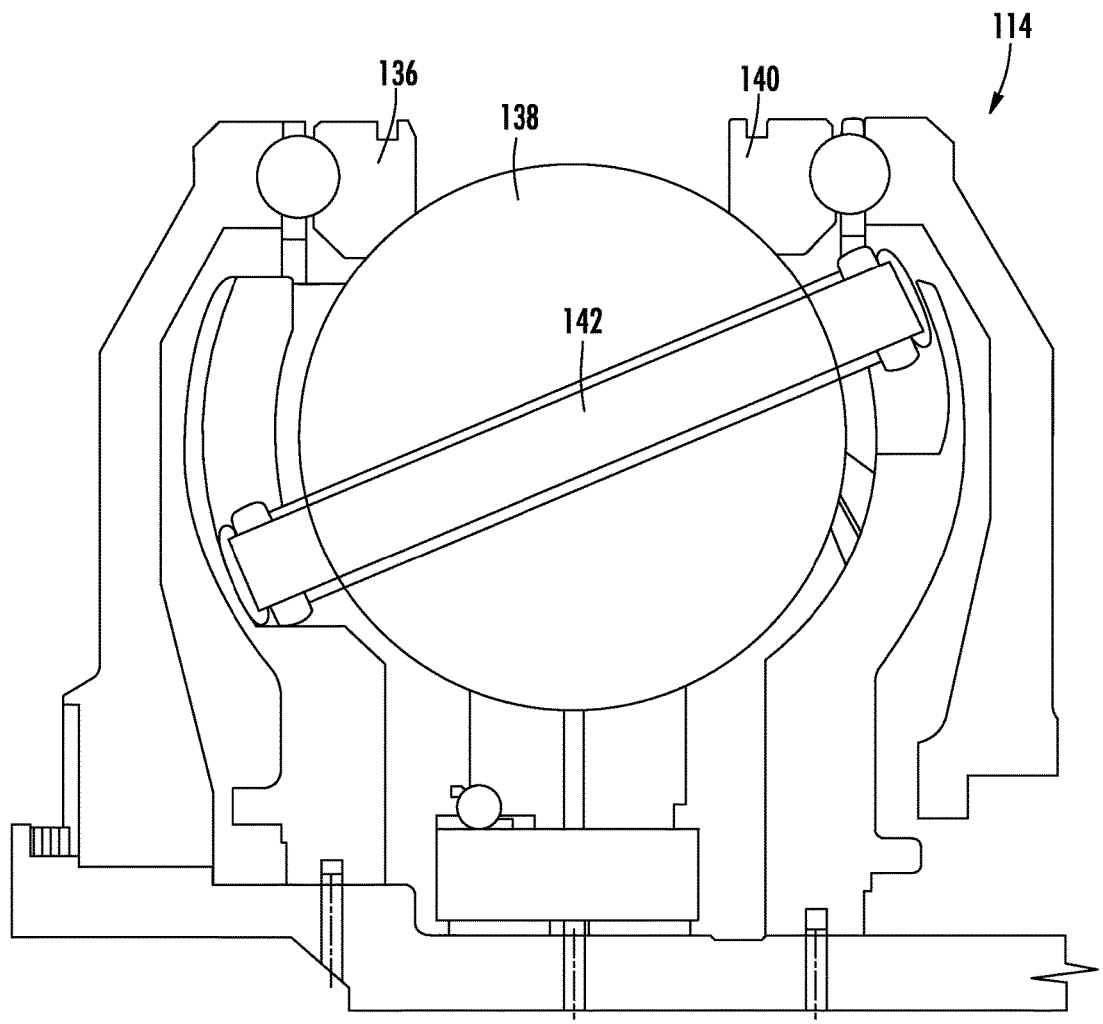
FIG. 2 is a side elevation view of the variator of the infinitely variable transmission of FIG. 1.

Referring now to FIG. 2, in the illustrative embodiment, the variator 114 is embodied as a planetary-type ball variator and includes the input ring 136 and the output ring 140. Each of the variator rings 136, 140 are spaced apart as shown in FIG. 2 to permit a ball 138 to be positioned between the rings 136, 140. The ball 138 is configured to tilt between the rings 136, 140 to vary the ratio achieved using the variator 114. An axle 142 encircles the ball 138 as shown in FIG. 2. The ball 138 is tilted by continuously tilting the axle 142 so that continuously-variable torque output is produced using the variator 114.

Figure 3:
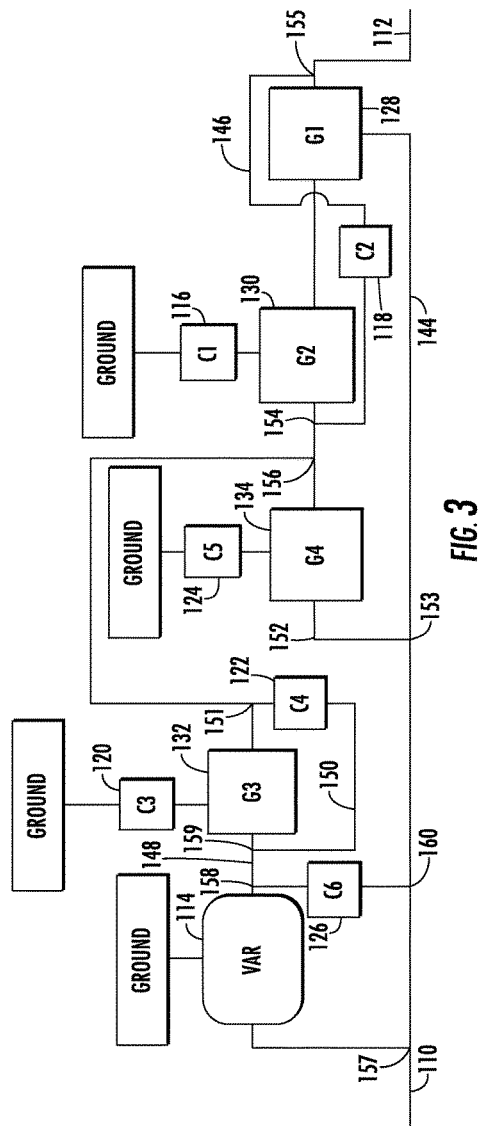
FIG. 3 is a block diagrammatic view of the architecture of the infinitely variable transmission of FIG. 1 showing various components included in the infinitely variable transmission.

Referring now to FIG. 3, the architecture of the transmission 104 is shown in which each gearset of the plurality of gearsets 127 is represented by a corresponding box (i.e., G1, G2, G3, and G4) and the variator 114 is designated as "VAR." G1 designates the first gearset 128, G2 designates the second gearset 130, G3 designates the third gearset 132, and G4 designates the fourth gearset 134. Each clutch of the plurality of clutches 127 is also represented by a box such that the following designations apply: C1 (the first clutch 116), C2 (the second clutch 118), C3 (the third clutch 120), C4 (the fourth clutch 122), C5 (the fifth clutch 124), and C6 (the variator bypass clutch 126).

It should be appreciated that the architecture of the transmission 104 defines a plurality of power paths along which power is transmitted between components included in the transmission 104 during one or more operational modes. In the illustrative embodiment, the plurality of power paths includes a power path 144, a power path 146, a power path 148, a power path 150, and a power path 152. As illustrated in FIGS. 6-17, power flow along the power path 144 is bi-directional in the plurality of operating modes of the transmission 104, and power flow along the power path 146 is uni-directional in the plurality of operating modes of the transmission 104.

The power path 144 is defined by a junction 157, a junction 153, a junction 160, the first gearset 128, the second gearset 130, the first clutch 116, a junction 154, and a junction 155. The input side of the power path 144 is defined at the junctions 157, 153. The junctions 157, 153 may be embodied as couplings permitting power received by the input shaft 110 to be transmitted along the power path 144 and toward the first gearset 128 and the second gearset 130. The junctions 157, 153 also permit power received by the input shaft 110 to be transmitted toward or away from the variator 114. As such, power may be transmitted along the power path 144 from the junction 153 to the first gearset 128, and power transmitted to the first gearset 128 along the power path 144 may be transmitted thereafter to the junction 155 and/or recirculated toward the input shaft 110 through the second gearset 130 and thereafter along one of the power paths 148, 150 as shown in FIGS. 6-17. Power may also be recirculated along the power path 144 from the first gearset 128 toward the input shaft 110 as shown in FIGS. 6-17.

As illustrated in FIGS. 6-17, the first gearset 128 is a "mixing" planetary gearset that allows one portion of power transmitted thereto to be transmitted to the junction 155 and therefrom to the output shaft 112, and another portion of power transmitted thereto to be recirculated back toward the input shaft 110. Each component of the first gearset 128 (i.e., each of a sun gear, a carrier, a ring gear, and a plurality of planet gears included in the first gearset 128 as described in more detail below) rotates and is configured to transmit power (i.e., no component of the first gearset 128 is grounded).

The power path 144 utilizes a "fixed" and a "variable" sub-path to transmit power, whereas the power path 146 utilizes only a "fixed" sub-path to transmit power. Power transmitted along the "fixed" sub-path is transmitted at a fixed mechanical ratio. Conversely, power transmitted along the "variable" sub-path is transmitted over a continuously-variable ratio range, i.e., embodied as power transmitted through the variator 114. The "fixed" and "variable" sub-paths of the power path 144 are described below, and the "fixed" sub-path of the power path 146 is also described below.

Figure 7:
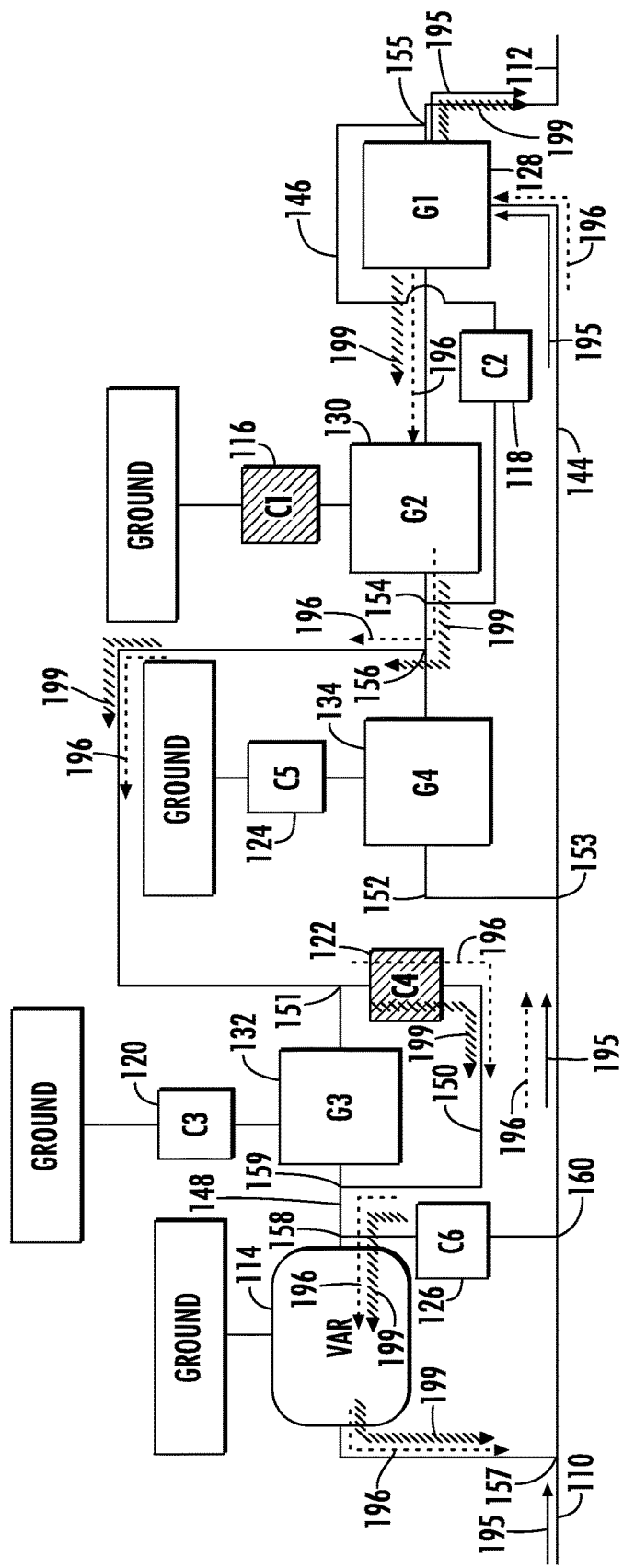
FIG. 7 is a block diagrammatic view of the infinitely variable transmission of FIG. 3 showing power flow therethrough in a first forward operating mode.
Figure 10:
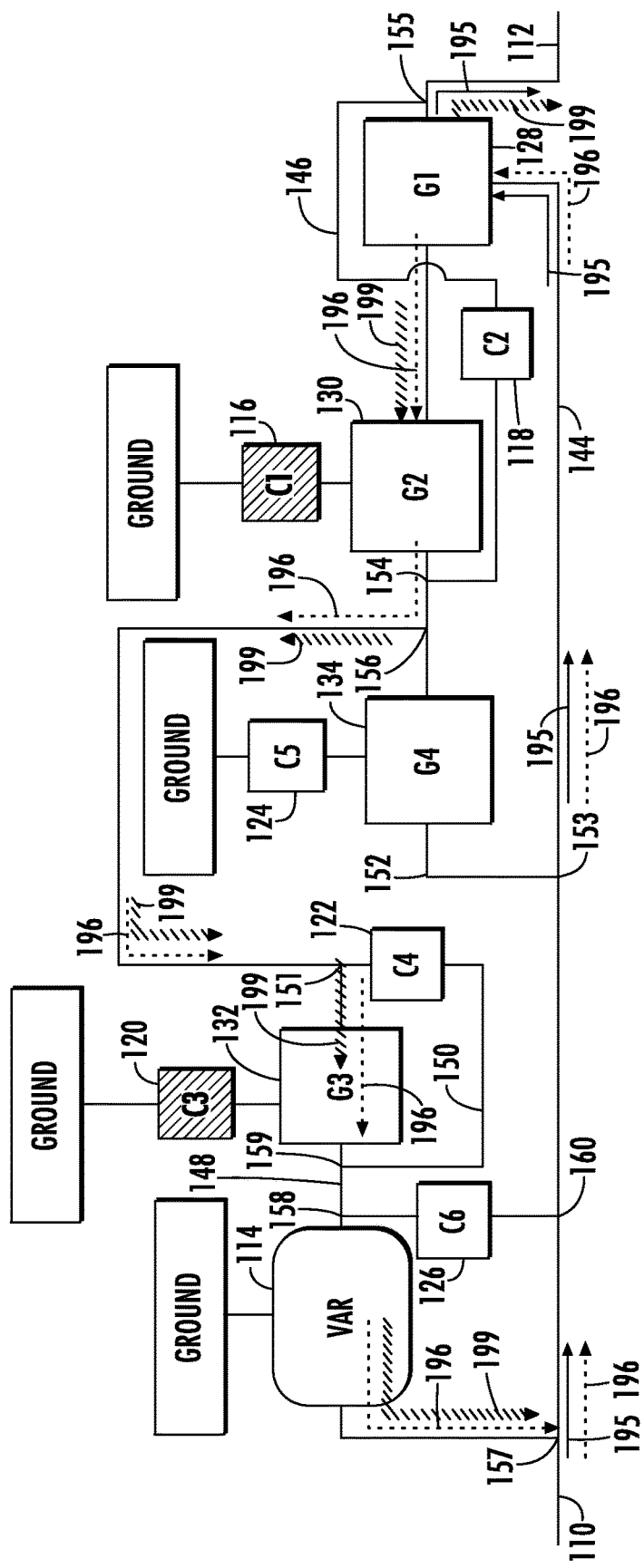
FIG. 10 is a block diagrammatic view of the infinitely variable transmission of FIG. 3 showing power flow therethrough in a second forward operating mode.

The "fixed" sub-path of the power path 144 corresponds to power flowing from the junction 153 to the first gearset 128 and from the first gearset 128 to the junction 155 (e.g., as shown in FIGS. 7 and 10). The "variable" sub-path of the power path 144 corresponds to power flowing from the junction 153 to the junction 154 through both the first and second gearsets 128, 130 and therefrom toward the variator 114 along one of the power paths 148, 150 (e.g., as shown in FIGS. 7 and 10).

The power path 146 is defined by the junction 154, the second clutch 118, and the junction 155. The power path 146 is utilized in conjunction with at least one of the power paths 144, 148, 150, 152 to transmit power from the input shaft 110 to the output shaft 112 as shown in FIGS. 6-17. It should be appreciated that the power path 146 is "direct" in that power transmitted along the power path 146 is not split or recirculated as shown in FIGS. 6-17.

Figure 12:
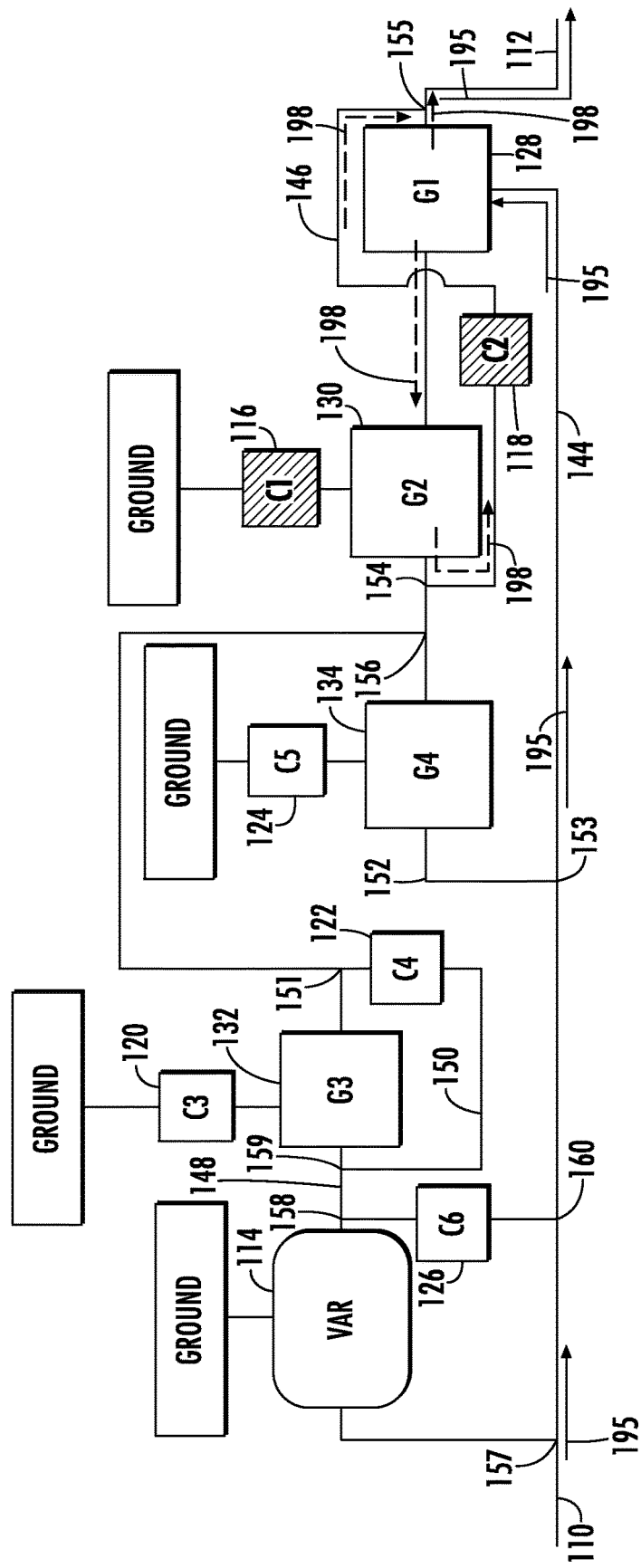
FIG. 12 is a block diagrammatic view of the infinitely variable transmission of FIG. 3 showing power flow therethrough in a synchronous operating mode.

The "fixed" sub-path of the power path 146 corresponds to power flowing from the junction 154 to the junction 155 and therefrom to the output shaft 112 when the second clutch 118 is engaged (e.g., as shown in FIGS. 12-17). Power may be transmitted to the junction 154 from the input shaft 110 along one of the power paths 148, 150, 152 (e.g., as shown in FIGS. 13-14 and 16-17), or power may be transmitted to the junction 154 from the input shaft 110 along the power path 144 (e.g., as shown in FIG. 12).

Figure 11:
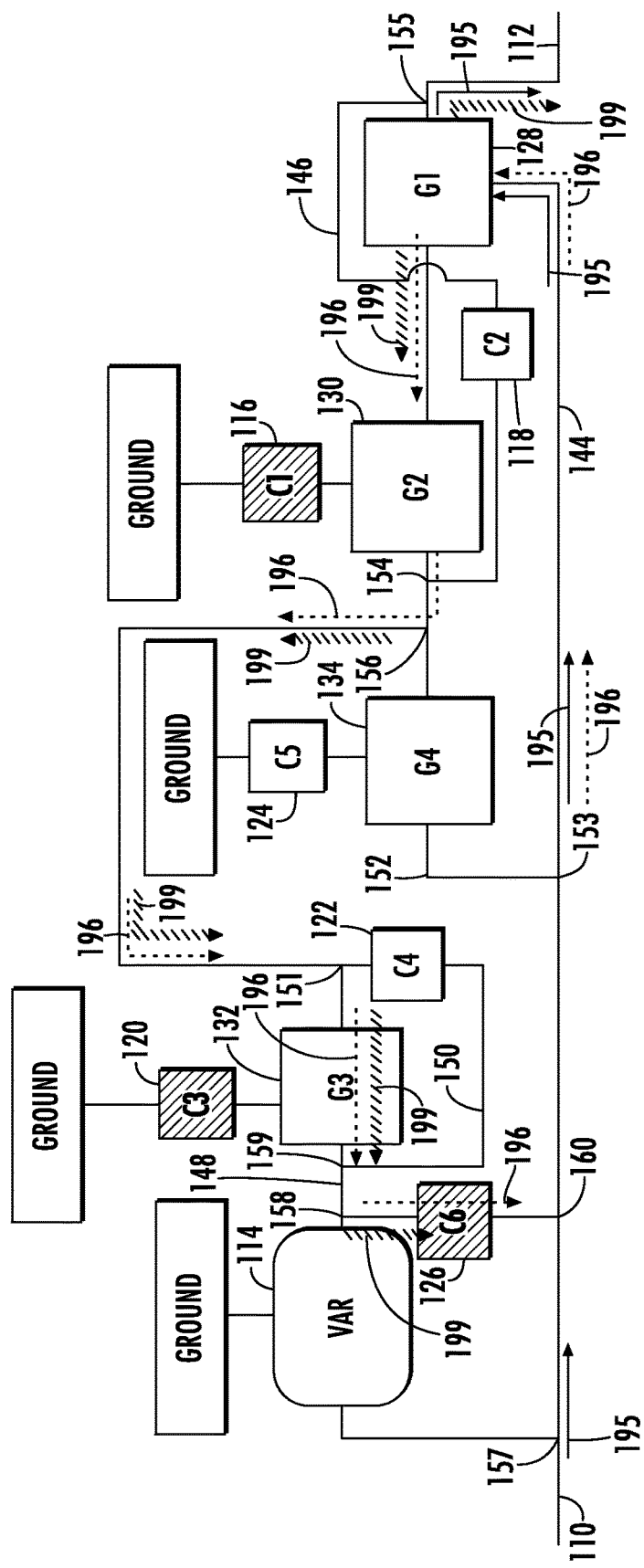
FIG. 11 is a block diagrammatic view of the infinitely variable transmission of FIG. 3 showing power flow therethrough in a second variator bypass operating mode.

The power path 148 is defined by a junction 157, the variator 114, a junction 158, a junction 159, a junction 160, the variator bypass clutch 126, the third gearset 132, the third clutch 120, a junction 151, a junction 156, and the junction 154. Similar to the power path 144, the power path 148 utilizes a "fixed" and a "variable" sub-path to transmit power between components of the transmission 104. The "fixed" sub-path of the power path 148 corresponds to power flowing between the junctions 159, 154 when the third clutch 120 and the variator bypass clutch 126 are contemporaneously engaged (e.g., as shown in FIG. 11). The "variable" sub-path of the power path 148 corresponds to power flowing between the junctions 157, 158 (i.e., through the variator 114) when the third clutch 120 is engaged and the variator bypass clutch 126 is not engaged (e.g., as shown in FIG. 10).

Figure 6:
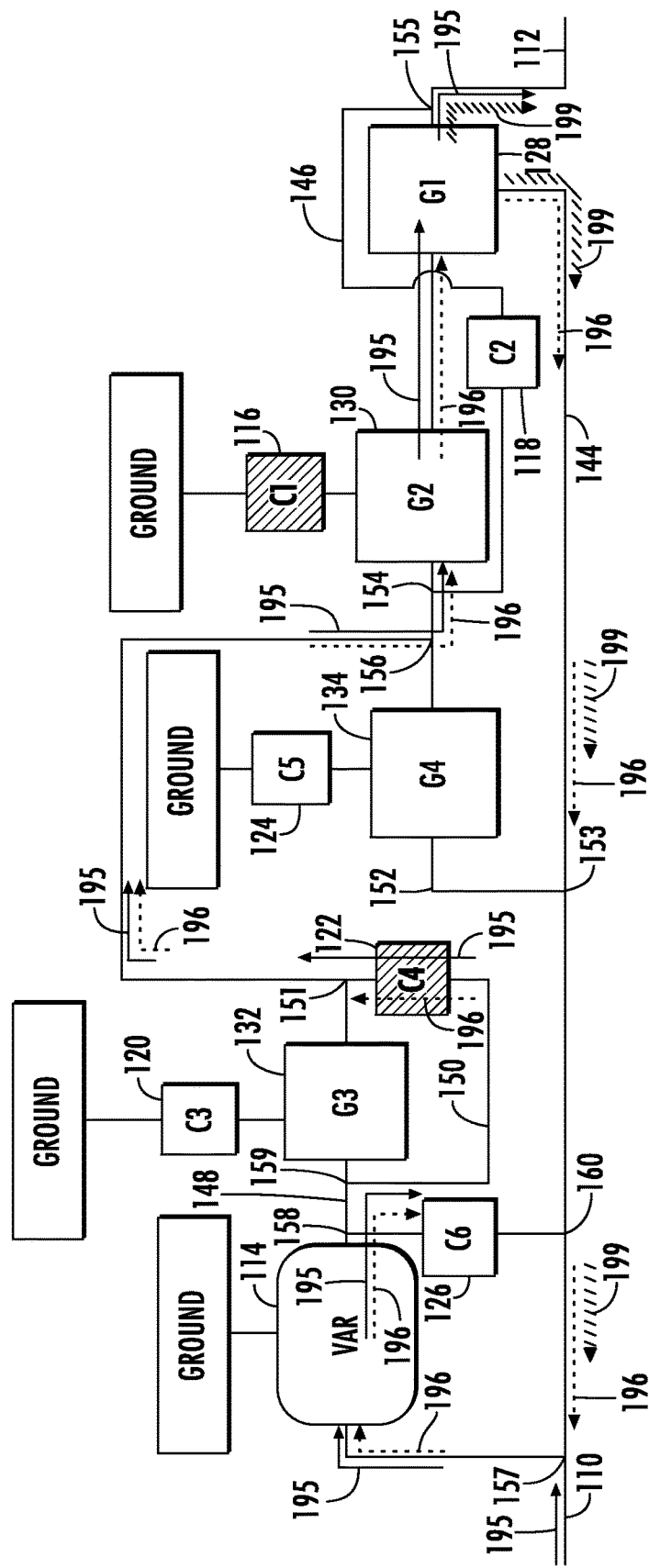
FIG. 6 is a block diagrammatic view of the infinitely variable transmission of FIG. 3 showing power flow therethrough in a first reverse operating mode.
Figure 8:
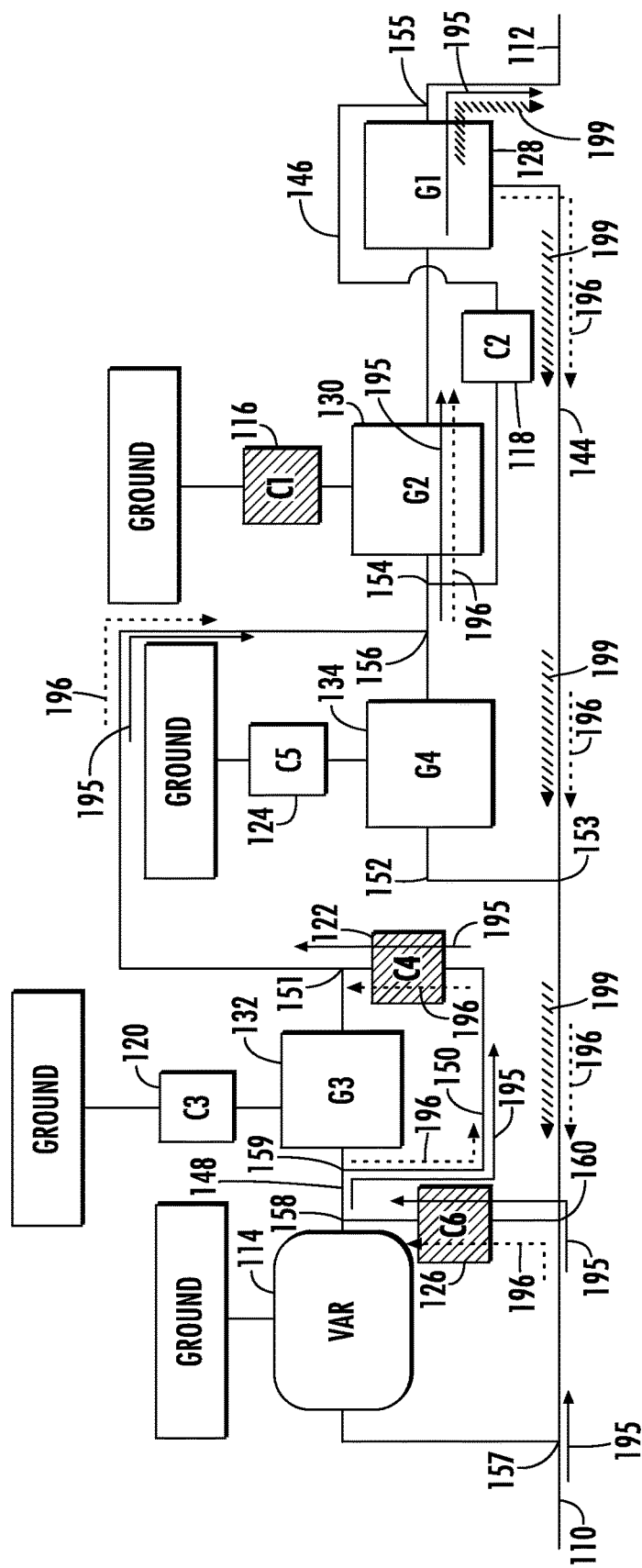
FIG. 8 is a block diagrammatic view of the infinitely variable transmission of FIG. 3 showing power flow therethrough in a first variator bypass operating mode.

The power path 150 is defined by the junction 157, the variator 114, the junction 158, the junction 159, the junction 160, the variator bypass clutch 126, the fourth clutch 122, the junction 151, and the junction 156. Similar to the power path 148, the power path 150 utilizes a "fixed" sub-path and a "variable" sub-path to transmit power between components of the transmission 104. The "fixed" sub-path of the power path 150 corresponds to power flowing between the junctions 159, 156 when the fourth clutch 122 and the variator bypass clutch 126 are contemporaneously engaged (e.g., as shown in FIG. 8). The "variable" sub-path of the power path 150 corresponds to power flowing between the junctions 157, 158 (i.e., through the variator 114) when the fourth clutch 122 is engaged and the variator bypass clutch 126 is not engaged (e.g., as shown in FIGS. 6-7).

The power path 152 is defined by the junction 157, the junction 160, the junction 153, the fourth gearset 134, the fifth clutch 124, and the junction 156. As discussed below and shown in FIGS. 9 and 15, the power path 152 is utilized in a first transition operating mode to effect a synchronous transition from an operating mode in which power is transmitted along the power path 150 (i.e., the "Mode 1" operating mode) to an operating mode in which power is transmitted along the power path 148 (i.e., the "Mode 2" operating mode). Additionally, the power path 152 is utilized in a second transition operating mode to effect a synchronous transition from an operating mode in which power is transmitted along the power path 148 (i.e., the "Mode 3" operating mode) to an operating mode in which power is transmitted along the power path 150 (i.e., the "Mode 4" operating mode). The power path 152 does not utilize the variator 114 to transmit power between components of the transmission 104, and therefore the power path 152 utilizes only a "fixed" sub-path to transmit power between the transmission 104 components.

Figure 4:
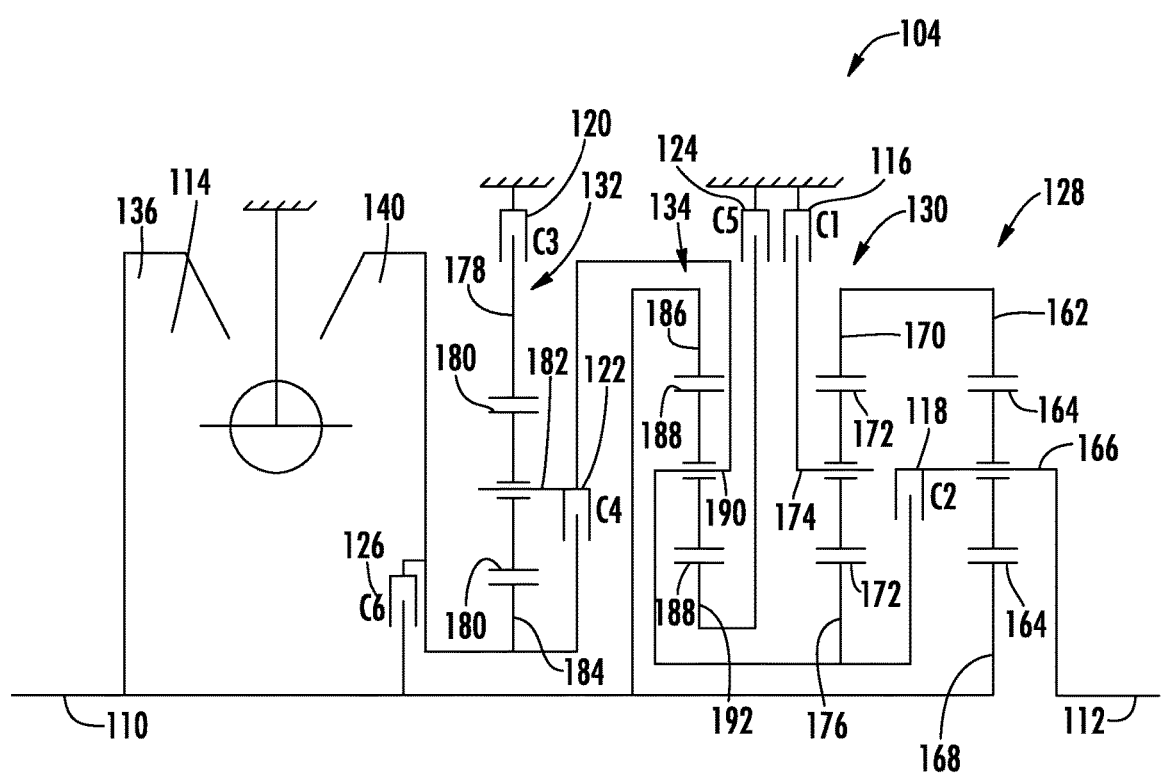
FIG. 4 is a schematic of the architecture of FIG. 3 and the associated transmission components showing various interconnections between each of the transmission components.

Referring now to FIG. 4, the variator 114, the plurality of gearsets 127, and the plurality of clutches 115 of the transmission 104 are physically arranged between the input shaft 110 and the output shaft 112 of the transmission 104. In the illustrative physical arrangement of the transmission 104, the variator 114 is positioned in front of the plurality of clutches 115 and the plurality of gearsets 127 relative to the input shaft 110 as shown in FIG. 4.

The first gearset 128 of the plurality of gearsets 127 is configured to receive power supplied by the input shaft 110 and transmitted to the junction 153 and thereafter to the first gearset 128 as shown, for example, in FIGS. 7 and 10-12. The first gearset 128 is illustratively a simple planetary gearset that includes a ring gear 162, a plurality of planet gears 164, a carrier 166, and a sun gear 168. Each of the planet gears 164 is intermeshed with the ring gear 162 and the sun gear 168, and each of the planet gears 164 is supported for rotation by the carrier 166. Power from the input shaft 110 is transmitted to the junction 153 and therefrom to the sun gear 168. The ring gear 162 of the first gearset 128 is coupled to the second gearset 130, and the carrier 166 of the first gearset 128 is coupled to the output shaft 112. The second clutch 118 is engageable to couple the carrier 166 of the first gearset 128 to the second gearset 130.

The second gearset 130 of the plurality of gearsets 127 is configured to receive power supplied by the input shaft 110 and transmitted to the junction 153 and therefrom to the second gearset 130 through the first gearset 128 as shown in, for example, FIGS. 7 and 10-12. The second gearset 130, similar to the first gearset 128, is illustratively a simple planetary gearset that includes a ring gear 170, a plurality of planet gears 172, a carrier 174, and a sun gear 176. Each of the planet gears 172 is intermeshed with the ring gear 170 and the sun gear 176, and each of the planet gears 172 is supported for rotation by the carrier 174. The first clutch 116 is engageable to couple the carrier 174 to a stationary, non-rotating part of the transmission 104, thereby preventing the carrier 174 from rotating (i.e., braking the carrier 174). For instance, the first clutch 116 may be engaged to couple the carrier 174 to a housing of the transmission 104. The ring gear 170 of the second gearset 130 is coupled to the ring gear 162 of the first gearset 128. The second clutch 118 is engageable to couple the sun gear 176 of the second gearset 130 to the carrier 166 of the first gearset 128. The sun gear 176 of the second gearset 130 is coupled to the fourth gearset 134.

The third gearset 132 of the plurality of gearsets 127 is configured to receive power transmitted between the input shaft 110 and the output shaft 112 when the third clutch 120 is engaged as shown, for example, in FIGS. 10-11 and 13-14. The third gearset 132 is illustratively a simple planetary gearset that includes a ring gear 178, a plurality of planet gears 180, a carrier 182, and a sun gear 184. Each of the planet gears 180 is intermeshed with the ring gear 178 and the sun gear 184, and each of the planet gears 180 is supported for rotation by the carrier 182. The third clutch 120 is engageable to couple the ring gear 178 to a stationary, non-rotating part of the transmission 104, thereby preventing the ring gear 178 from rotating (i.e., braking the ring gear 178). For instance, the third clutch 120 may be engaged to couple the ring gear 178 to the housing of the transmission 104. The sun gear 184 is coupled to the output ring 140 of the variator 114, and the fourth clutch 122 is engageable to couple the sun gear 184 to the fourth gearset 134. As such, the fourth clutch 122 is engageable to couple the output ring 140 of the variator 114 to the fourth gearset 134 through the sun gear 184 of the third gearset 132. The fourth clutch 122 is also engageable to couple the carrier 182 to the fourth gearset 134.

Figure 9:
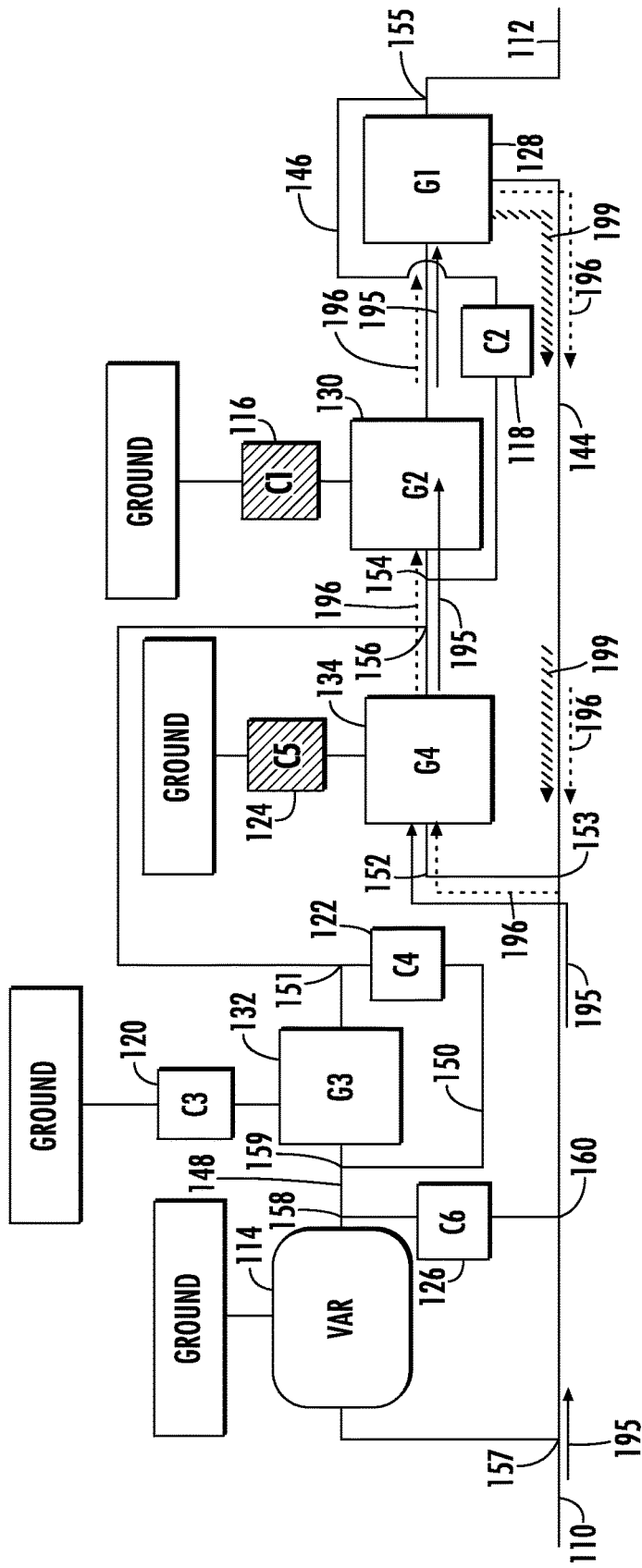
FIG. 9 is a block diagrammatic view of the infinitely variable transmission of FIG. 3 showing power flow therethrough in a first transition operating mode.
Figure 15:
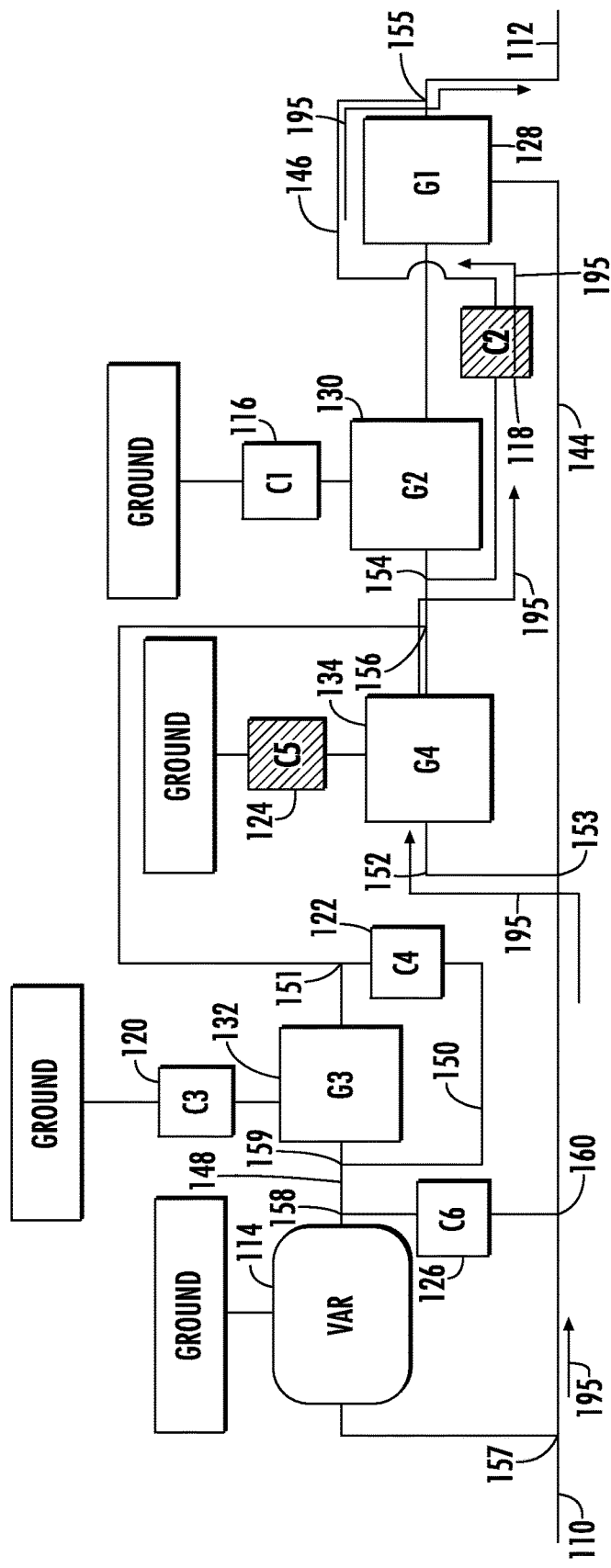
FIG. 15 is a block diagrammatic view of the infinitely variable transmission of FIG. 3 showing power flow therethrough in a second transition operating mode.

The fourth gearset 134 of the plurality of gearsets 127 is configured to receive power transmitted between the input shaft 110 and the output shaft 112 when the fifth clutch 124 is engaged as shown, for example, in FIGS. 9 and 15. The fourth gearset 134 is illustratively a simple planetary gearset that includes a ring gear 186, a plurality of planet gears 188, a carrier 190, and a sun gear 192. Each of the planet gears 188 is intermeshed with the ring gear 186 and the sun gear 192, and each of the planet gears 188 is supported for rotation by the carrier 190. The ring gear 186 is coupled to the input shaft 110 to receive power therefrom. The carrier 190 is coupled to the sun gear 176 of the second gearset 130, and the second clutch 118 is engageable to couple the sun gear 176 of the second gearset 130 to the carrier 166 of the first gearset 128. As such, the second clutch 118 is engageable to couple the carrier 190 of the fourth gearset 134 to the carrier 166 of the first gearset 128 through the sun gear 176 of the second gearset 130. The fourth clutch 122 is engageable to couple the carrier 190 to the carrier 182 of the third gearset 132 and the sun gear 184 of the third gearset 132. The fifth clutch 124 is engageable to couple the sun gear 188 to a stationary, non-rotating part of the transmission 104, thereby preventing the sun gear 188 from rotating (i.e., braking the sun gear 188). For instance, the fifth clutch 124 may be engaged to couple the sun gear 188 to the housing of the transmission 104.

A power take-off device (not shown) may be coupled to the variator 114 to transmit power from the drive unit 102 to the variator 114 and therefrom to the power-take off device.

The power take-off device may be coupled to the output ring 140 of the variator 114. When the transmission 104 is placed in a neutral range, the variator 114 may be used to continuously vary the ratio of the power-take off device relative to the rotational speed of the drive unit output shaft 108 and the transmission input shaft 110.

Referring now to FIG. 5, a table 194 illustrates the various operating modes of the transmission 104, the clutches applied in each mode, the transmission ratio(s) achieved in each mode, and the figure(s) in which each mode is shown. The transmission 104 is operable in four operating modes to achieve a variable transmission ratio within a defined transmission ratio range. In all other operating modes, as discussed below, the transmission 104 achieves a single transmission ratio.

The transmission 104 is operable in the "Mode 1" operating mode, when the first clutch 116 and the fourth clutch 122 are contemporaneously engaged as shown in FIG. 5, to achieve a variable transmission ratio within the range of −0.536 (minimum) to 0.020 (maximum). As suggested above, the variable transmission ratio is achievable in "Mode 1" as a result of utilizing the variator 114. The "Mode 1" operating mode covers a reverse ratio range (i.e., a ratio range from −0.330 to 0.000) to a low forward ratio range (i.e., 0.000 to 0.020). The "Mode 1" operating mode covers a zero ratio and therefore provides a first geared neutral mode.

The transmission 104 is operable in a first variator bypass operating mode (referred to as "Lock 1" in table 194), when the first clutch 116, the fourth clutch 122, and the variator bypass clutch 126 are contemporaneously engaged as shown in FIG. 5, to achieve a fixed transmission ratio of −0.179. Because the variator 114 is bypassed in the "Lock 1" mode, only a single fixed transmission ratio is achieved by the transmission 104. The "Lock 1" operating mode covers a reverse ratio.

The transmission 104 is operable in a first transition operating mode (referred to as "Bypass 1-2" in table 194), when the first clutch 116 and the fifth clutch 124 are contemporaneously engaged, as shown in FIG. 5, to achieve a fixed transmission ratio of 0.000. The "Bypass 1-2" mode therefore provides a second geared neutral mode. As discussed in more detail below, the "Bypass 1-2" operating mode is utilized to effect a synchronous transition from transmitting power between the input shaft 110 and the output shaft 112 along the power path 150 in the "Mode 1" operating mode to transmitting power between the input shaft 110 and the output shaft 112 along the power path 148 in the "Mode 2" operating mode.

The ratios achieved by the transmission 104 in the "Mode 1" and "Mode 2" operating modes overlap such that the variator 114 output torque ratios in those modes overlap as well. Transitioning from transmitting power along the power path 150 in the "Mode 1" operating mode to transmitting power along the power path 148 in the "Mode 2" operating mode requires a first transition ratio in the overlapping portion of the variator 114 ratios to be determined The first transition ratio corresponds to a point at which the transmission 104 transitions from transmitting power along the power path 150 in "Mode 1" to transmitting power along the power path 148 in "Mode 2." The variator 114 is operable to output torque at a first torque ratio at one end of the operating range of the variator 114 in the "Mode 1" operating mode, and torque at a second torque ratio different from the first torque ratio at another opposite end of the operating range of the variator 114 in the "Mode 2" operating mode. The first torque ratio is illustratively greater than the second torque ratio, but it should be understood that the first torque ratio may be less than the second torque ratio. Because transitioning from "Mode 1" to "Mode 2" at the first transition ratio requires the variator 114 to adjust from outputting torque at the first torque ratio (i.e., at the one end of the variator 114 operating range) to outputting torque at the second torque ratio (i.e., at the opposite end of the variator 114 operating range), the first transition ratio prevents a single-shift synchronous transition from transmitting torque along the power path 150 in the "Mode 1" operating mode to transmitting torque along the power path 148 in the "Mode 2" operating mode. The power path 152 is utilized, as discussed below, to effect a synchronous transition from transmitting power along the power path 150 in "Mode 1" to transmitting power along the power path 148 in "Mode 2."

The power path 152 is utilized to enable the variator 114 to synchronously transition between outputting torque at the first and second torque ratios in the "Mode 1" and "Mode 2" operating modes, respectively, to effect a transition from the "Mode 1" operating mode to the "Mode 2" operating mode. Specifically, the fifth clutch 124 is engaged and the fourth clutch 122 is disengaged during a first period of time to permit power flow along the power path 152 and prevent power flow along the power path 150 in response to the variator 114 outputting torque at a ratio approaching the first transition ratio in the "Mode 1" operating mode (see FIG. 9). During the first period of time, the fifth clutch 124 is first engaged and the fourth clutch 122 is disengaged substantially immediately thereafter. Once the fifth clutch 124 has been engaged and the fourth clutch 122 has been disengaged thereafter, the variator 114 adjusts (i.e., at the first transition ratio) from outputting torque at the first torque ratio in "Mode 1" to outputting torque at the second torque ratio in "Mode 2." Once the variator 114 adjusts to outputting torque at the second torque ratio associated with "Mode 2," the third clutch 120 is engaged and the fifth clutch 124 is disengaged during a second period of time following the first period of time to permit power flow along the power path 148 and prevent power flow along the power path 152. The second period of time occurs substantially immediately after the first period of time. During the second period of time, the third clutch 120 is first engaged and the fifth clutch 124 is disengaged substantially immediately thereafter. Once the third clutch 120 has been engaged and the fifth clutch 124 has been disengaged thereafter, the transmission 104 is operable in the "Mode 2" operating mode and the transition from the "Mode 1" operating mode to the "Mode 2" operating mode has been completed.

Referring back to FIG. 5, the transmission 104 is operable in the "Mode 2" operating mode, when the first clutch 116 and the third clutch 120 are contemporaneously engaged, to achieve a variable transmission ratio within the range of 0.000 (minimum) to 0.185 (maximum). As suggested above, the variable transmission ratio is achievable in "Mode 2" as a result of utilizing the variator 114. The "Mode 2" operating mode provides a third geared neutral mode and covers a forward ratio range (i.e., from 0.000 to 0.185).

The transmission 104 is operable in a second variator bypass operating mode (referred to as "Lock 2" in the table 194), when the first clutch 116, the third clutch 120, and the variator bypass clutch 126 are contemporaneously engaged as shown in FIG. 5, to achieve a fixed transmission ratio of 0.119. Because the variator 114 is bypassed in the "Lock 2" operating mode, only a single fixed transmission ratio is achieved by the transmission 104. The "Lock 2" operating mode covers a forward ratio.

The transmission 104 is operable in the "Sync 2-3" operating mode, when the first clutch 116 and the second clutch 118 are contemporaneously engaged as shown in FIG. 5, to achieve a fixed transmission ratio of 0.185. The ratio of 0.185 coincides with the maximum ratio achieved in the "Mode 2" operating mode and the minimum ratio achieved in the "Mode 3" operating mode (discussed below) so that the "Sync 2-3" operating mode effects a synchronous transition between those two modes. A single fixed transmission ratio is achieved by the transmission 104 in the "Sync 2-3" mode because the variator 114 is effectively bypassed. The "Sync 2-3" operating mode covers another forward ratio.

The transmission 104 is operable in the "Mode 3" operating mode, when the second clutch 118 and the third clutch 120 are contemporaneously engaged as shown in FIG. 5, to achieve a variable transmission ratio within the range of 0.185 (minimum) to 0.600 (maximum). As suggested above, the variable transmission ratio is achievable in "Mode 3" as a result of utilizing the variator 114. The "Mode 3" operating mode covers another forward ratio range.

The transmission 104 is operable in a third variator bypass operating mode (referred to as "Lock 3" in table 194), when the second clutch 118, the third clutch 120, and the variator bypass clutch 126 are contemporaneously engaged as shown in FIG. 5, to achieve a fixed transmission ratio of 0.333. Because the variator 114 is bypassed in the "Lock 3" operating mode, only a single fixed transmission ratio is achieved by the transmission 104. The "Lock 3" operating mode covers another forward ratio.

The transmission 104 is operable in a second transition operating mode (referred to as "Bypass 3-4" in table 194), when the second clutch 118 and the fifth clutch 124 are contemporaneously engaged, as shown in FIG. 5, to achieve a fixed transmission ratio of 0.600. As discussed in more detail below, the "Bypass 3-4" operating mode is utilized to effect a synchronous transition from transmitting power between the input shaft 110 and the output shaft 112 along the power path 148 in the "Mode 3" operating mode to transmitting power between the input shaft 110 and the output shaft 112 along the power path 150 in the "Mode 4" operating mode.

The ratios achieved by the transmission 104 in the "Mode 3" and "Mode 4" operating modes overlap such that the variator 114 output torque ratios in those modes overlap as well. Transitioning from transmitting power along the power path 148 in the "Mode 3" operating mode to transmitting power along the power path 150 in the "Mode 4" operating mode requires a second transition ratio in the overlapping portion of the variator 114 ratios to be determined The second transition ratio corresponds to a point at which the transmission 104 transitions from transmitting power along the power path 148 in "Mode 3" to transmitting power along the power path 150 in "Mode 4." The variator 114 is operable to output torque at a third torque ratio at one end of the operating range of the variator 114 in the "Mode 3" operating mode, and torque at a fourth torque ratio different from the third torque ratio at another opposite end of the operating range of the variator 114 in the "Mode 4" operating mode. The third torque ratio is illustratively greater than the fourth torque ratio, but it should be understood that the third torque ratio may be less than the fourth torque ratio. Because transitioning from "Mode 3" to "Mode 4" at the second transition ratio requires the variator 114 to adjust from outputting torque at the third torque ratio (i.e., at the one end of the variator 114 operating range) to outputting torque at the fourth torque ratio (i.e., at the opposite end of the variator 114 operating range), the second transition ratio prevents a single-shift synchronous transition from transmitting torque along the power path 148 in the "Mode 3" operating mode to transmitting torque along the power path 150 in the "Mode 4" operating mode. The power path 152 is utilized, as discussed below, to effect a synchronous transition from transmitting power along the power path 148 in "Mode 3" to transmitting power along the power path 150 in "Mode 4."

The power path 152 is utilized to enable the variator 114 to synchronously transition between outputting torque at the third and fourth torque ratios in the "Mode 3" and "Mode 4" operating modes, respectively, to effect a transition from the "Mode 3" operating mode to the "Mode 4" operating mode. Specifically, the fifth clutch 124 is engaged and the third clutch 120 is disengaged during a third period of time to permit power flow along the power path 152 and prevent power flow along the power path 148 in response to the variator 114 outputting torque at a ratio approaching the second transition ratio in the "Mode 3" operating mode (see FIG. 15). During the third period of time, the fifth clutch 124 is first engaged and the third clutch 120 is disengaged substantially immediately thereafter. Once the fifth clutch 124 has been engaged and the third clutch 120 has been disengaged thereafter, the variator 114 adjusts (i.e., at the first transition ratio) from outputting torque at the third torque ratio in "Mode 3" to outputting torque at the fourth torque ratio in "Mode 4." Once the variator 114 adjusts to outputting torque at the fourth torque ratio associated with "Mode 4," the fourth clutch 122 is engaged and the fifth clutch 124 is disengaged during a fourth period of time following the third period of time to permit power flow along the power path 150 and prevent power flow along the power path 152. The fourth period of time occurs substantially immediately after the third period of time. During the fourth period of time, the fourth clutch 122 is first engaged and the fifth clutch 124 is disengaged substantially immediately thereafter. Once the fourth clutch 122 has been engaged and the fifth clutch 124 has been disengaged thereafter, the transmission 104 is operable in the "Mode 4" operating mode and the transition from the "Mode 3" operating mode to the "Mode 4" operating mode has been completed.

Referring back to FIG. 5, the transmission 104 is operable in the "Mode 4" operating mode, when the second clutch 118 and the fourth clutch 122 are contemporaneously engaged, to achieve a variable transmission ratio within the range of 0.556 (minimum) to 1.800 (maximum). As suggested above, the variable transmission ratio is achievable in "Mode 4" as a result of utilizing the variator 114. The "Mode 4" operating mode covers another forward ratio range.

The transmission 104 is operable in a fourth variator bypass operating mode (referred to as "Lock 4" in table 194), when the second clutch 118, the fourth clutch 122, and the variator bypass clutch 126 are contemporaneously engaged as shown in FIG. 5, to achieve a fixed transmission ratio of 1.000. Because the variator 114 is bypassed in the "Lock 4" operating mode, only a single fixed transmission ratio is achieved by the transmission 104. The "Lock 4" operating mode covers another forward ratio.

Referring now to FIGS. 6-17, power flow from the input shaft 110 to the output shaft 112 of the transmission 104 is illustrated in each of the operating modes discussed above. Beginning with the reverse ratio range of "Mode 1" of table 194, power flows from the input shaft 110 to the output shaft 112 of the transmission 104 are shown in FIG. 6. Input power 195 (designated by the solid arrows) flows from the input shaft 110 to the junction 157 as shown in FIG. 6. Input power 195 is transmitted from the junction 157 to the junction 156 through the variator 114, the junctions 158, 159, 151, and the fourth clutch 122, and input power 195 reaching the junction 156 is transmitted to the first gearset 128 through the second gearset 130 and the junction 154. Input power 195 reaching the first gearset 128 is modified by the "mixing" gearset 128 such that some of the power that is output from the first gearset 128 flows to the junction 155 and thereafter to the output shaft 112 and some of the power flows back to the junction 157, as described in greater detail below.

Recirculated power 196 (designated by the dotted arrows) is recirculated from the first gearset 128 back to the junction 157 through the junctions 153, 160 as shown in FIG. 6. At the junction 157, recirculated power 196 is combined with input power 195 received from the input shaft 110. Recirculated power 196 then flows in parallel with input power 195 from the junction 157 to the first gearset 128 through the variator 114, the fourth clutch 122, the second gearset 130, and the junctions 158, 159, 151, 156, 154 in identical fashion to input power 195. Hereafter, the combination of input power 195 and recirculated power 196 is referred to as "combined power" and is understood to be greater than input power 195 and recirculated power 196.

The "mixing" gearset 128 breaks up the combined power into split power 199 (designated by the slashed arrows), which is transmitted to the junction 155 and back to the junction 157, as shown in FIG. 6. In this way, some split power 199 flows from the junction 155 to the output shaft 112, thereby adding to the power transmitted to the output shaft 112. Some split power 199 also flows from the first gearset 128 to the junction 157 and, like recirculated power 196, back through the variator 114 to the first gearset 128 in parallel with input power 195.

Turning now to the forward ratio range of "Mode 1" of table 194, power flows from the input shaft 110 to the output shaft 112 of the transmission 104 as shown in FIG. 7. Input power 195 (designated by the solid arrows) flows from the input shaft 110 to the junction 157 and thereafter to the first gearset 128 as shown in FIG. 7. Input power 195 flowing to the first gearset 128 is modified by the "mixing" gearset 128 such that some of the power that is output from the first gearset 128 flows to the junction 155 and thereafter to the output shaft 112 and some of the power flows back to the junction 157, as described in greater detail below.

Recirculated power 196 (designated by the dotted arrows) is transmitted from the first gearset 128 back to the junction 157 as shown in FIG. 7. Specifically, recirculated power 196 is transmitted from the first gearset 128 to the junction 156 through the second gearset 130 and the junction 154 as shown in FIG. 7. From the junction 156, recirculated power 196 is then transmitted to the junction 157 through the variator 114, the junctions 158, 159, 151, and the fourth clutch 122. At the junction 157, recirculated power 196 is combined with input power 195 received from the input shaft 110. Recirculated power 196 then flows in parallel with input power 195 from the junction 157 to the first gearset 128 in identical fashion to input power 195.

The "mixing" gearset 128 breaks up the combined power into split power 199 (designated by the slashed arrows), which is transmitted to the junction 155 and back to the junction 157, as shown in FIG. 7. In this way, some split power 199 flows from the junction 155 to the output shaft 112, thereby adding to the power transmitted to the output shaft 112. Some split power 199 also flows from the first gearset 128 to the junction 157 through the second gearset 130, the fourth clutch 122, the variator 114, and the junctions 154, 156, 151, 158, 159 and, like recirculated power 196, back through the first gearset 128 in parallel with input power 195.

Turning now to the "Lock 1" mode of table 194, power flows from the input shaft 110 to the output shaft 112 of the transmission 104 as shown in FIG. 8. Input power 195 (designated by the solid arrows) flows from the input shaft 110 to the junction 157 and thereafter to the junction 160 as shown in FIG. 8. Input power 195 is then transmitted from the junction 160 to the junction 156 through the junctions 158, 159, 151, the variator bypass clutch 126, and the fourth clutch 122 so that the variator 114 is bypassed (i.e., the variator 114 receives no power load). From the junction 156, input power 195 is transmitted to the first gearset 128 through the second gearset 130 and the junction 154. Input power 195 reaching the first gearset 128 is modified by the "mixing" gearset 128 such that some of the power that is output from the first gearset 128 flows to the junction 155 and thereafter to the output shaft 112 and some of the power flows back to the junction 160, as described in greater detail below.

Recirculated power 196 (designated by the dotted arrows) is recirculated from the first gearset 128 back to the junction 160 through the junction 153 as shown in FIG. 8. At the junction 160, recirculated power 196 is combined with input power 195 received from the input shaft 110. Recirculated power 196 then flows in parallel with input power 195 from the junction 160 to the first gearset 128 through the variator bypass clutch 126, the fourth clutch 122, the second gearset 130, and the junctions 158, 159, 151, 156, 154 in identical fashion to input power 195. Hereafter, the combination of input power 195 and recirculated power 196 is referred to as "combined power" and is understood to be greater than input power 195 and recirculated power 196.

The "mixing" gearset 128 breaks up the combined power into split power 199 (designated by the slashed arrows), which is transmitted to the junction 155 and back to the junction 160, as shown in FIG. 8. In this way, some split power 199 flows from the junction 155 to the output shaft 112, thereby adding to the power transmitted to the output shaft 112. Some split power 199 also flows from the first gearset 128 to the junction 160 and, like recirculated power 196, back through the variator bypass clutch 126 to the first gearset 128 in parallel with input power 195.

Turning to the "Bypass 1-2" mode of table 194, power flows from the input shaft 110 to the output shaft 112 of the transmission 104 as shown in FIG. 9. Input power 195 (designated by the solid arrows) is transmitted from the input shaft 110 to the junction 157 and thereafter to the junction 156 through the fourth gearset 134 and the junctions 160, 153 so that the variator 114 receives no power load as shown in FIG. 9. From the junction 156, input power 195 is transmitted to the first gearset 128 through the second gearset 130 and the junction 154. Input power 195 reaching the first gearset 128 becomes recirculated power 196 that is recirculated to the junction 153 as shown in FIG. 9. It should be appreciated that no power is transmitted from the first gearset 128 to the junction 155 and therefrom to the output shaft 112. As such, no power is transmitted from the input shaft 110 to the output shaft 112 in the geared neutral mode provided by the "Bypass 1-2" operating mode.

Recirculated power 196 (designated by the dotted arrows) is recirculated from the first gearset 128 to the junction 153 as shown in FIG. 9. At the junction 153, recirculated power 196 is combined with input power 195 received from the input shaft 110. Recirculated power 196 then flows in parallel with input power 195 from the junction 153 to the first gearset 128 through the gearsets 130, 134 and the junctions 156, 154 in identical fashion to input power 195. Hereafter, the combination of input power 195 and recirculated power 196 is referred to as "combined power" and is understood to be greater than input power 195 and recirculated power 196.

The "mixing" gearset 128 breaks up the combined power into split power 199 (designated by the slashed arrows), which is transmitted back to the junction 153 as shown in FIG. 9. In this way, split power 199 flows from the first gearset 128 to the junction 153 and, like recirculated power 196, back through the gearsets 130, 134 and the junctions 154, 156 to the first gearset 128 in parallel with input power 195.

Turning now to "Mode 2" of table 194, power flows from the input shaft 110 to the output shaft 112 of the transmission as shown in FIG. 10. Input power 195 (designated by the solid arrows) flows from the input shaft 110 to the junction 157 and thereafter to the first gearset 128 through the junctions 160, 153 as shown in FIG. 10. Input power 195 flowing to the first gearset 128 is modified by the "mixing" gearset 128 such that some of the power that is output from the first gearset 128 flows to the junction 155 and thereafter to the output shaft 112 and some of the power flows back to the junction 157, as described in greater detail below.

Recirculated power 196 (designated by the dotted arrows) is recirculated from the first gearset 128 to the junction 157 through the gearsets 130, 132, the junctions 154, 156, 151, 158, 159, and the variator 114 as shown in FIG. 10. At the junction 157, recirculated power 196 is combined with input power 195 received from the input shaft 110. Recirculated power 196 then flows in parallel with input power 195 from the junction 157 to the first gearset 128 through junctions 153, 160 in identical fashion to input power 195. Hereafter, the combination of input power 195 and recirculated power 196 is referred to as "combined power" and is understood to be greater than input power 195 and recirculated power 196.

The "mixing" gearset 128 breaks up the combined power into split power 199 (designated by the slashed arrows), which is transmitted to the junction 155 and back to the junction 157, as shown in FIG. 10. In this way, some split power 199 flows from the junction 155 to the output shaft 112, thereby adding to the power transmitted to the output shaft 112. Some split power 199 also flows from the first gearset 128 to the junction 157 through the gearsets 130, 132, the junctions 154, 156, 151, 158, 159, and the variator 114 and, like recirculated power 196, back through the first gearset 128 in parallel with input power 195.

Turning now to the "Lock 2" mode of table 194, power flows from the input shaft 110 to the output shaft 112 of the transmission 104 as shown in FIG. 11. Input power 195 (designated by the solid arrows) flows from the input shaft 110 to the junction 157 and thereafter to the first gearset 128 through the junctions 160, 153 as shown in FIG. 11. Input power 195 flowing to the first gearset 128 is modified by the "mixing" gearset 128 such that some of the power that is output from the first gearset 128 flows to the junction 155 and thereafter to the output shaft 112 and some of the power flows back to the junction 160, as described in greater detail below.

Recirculated power 196 (designated by the dotted arrows) is recirculated from the first gearset 128 to the junction 160 through the gearsets 130, 132, the junctions 154, 156, 151, 158, 159, and the variator bypass clutch 126 as shown in FIG. 11. At the junction 160, recirculated power 196 is combined with input power 195 received from the input shaft 110. Recirculated power 196 then flows in parallel with input power 195 from the junction 160 to the first gearset 128 through the junction 153 in identical fashion to input power 195. Hereafter, the combination of input power 195 and recirculated power 196 is referred to as "combined power" and is understood to be greater than input power 195 and recirculated power 196.

The "mixing" gearset 128 breaks up the combined power into split power 199 (designated by the slashed arrows), which is transmitted to the junction 155 and back to the junction 160, as shown in FIG. 11. In this way, some split power 199 flows from the junction 155 to the output shaft 112, thereby adding to the power transmitted to the output shaft 112. Some split power 199 also flows from the first gearset 128 to the junction 160 through the gearsets 130, 132, the junctions 154, 156, 151, 158, 159, and the variator bypass clutch 126 and, like recirculated power 196, back through the first gearset 128 in parallel with input power 195.

Turning now to the "Sync 2-3" mode of table 194, power flows from the input shaft 110 to the output shaft 112 of the transmission 104 as shown in FIG. 12. Input power 195 (designated by the solid arrows) flows from the input shaft 110 to the junction 157 and thereafter to the first gearset 128 through the junctions 160, 153 as shown in FIG. 12. Input power 195 reaching the first gearset 128 is modified by the "mixing" gearset 128 such that some of the power that is output from the first gearset 128 flows directly to the junction 155 and some of the power flows to the junction 155 through the second clutch 118 as shown in FIG. 12.

As shown in FIG. 12, the power flowing from the first gearset 128 to the junction 155 is designated input power 198 (shown in dashed). Input power 198 flows directly from the first gearset 128 to the junction 155, and input power 198 also flows from the first gearset 128 to the junction 155 through the second gearset 130, the junction 154, and the second clutch 118. Input power 195, therefore, is reconstituted at the junction 155 and transmitted thereafter to the output shaft 112. As shown in FIG. 12, the variator 114 is entirely bypassed and receives no power load.

Figure 13:
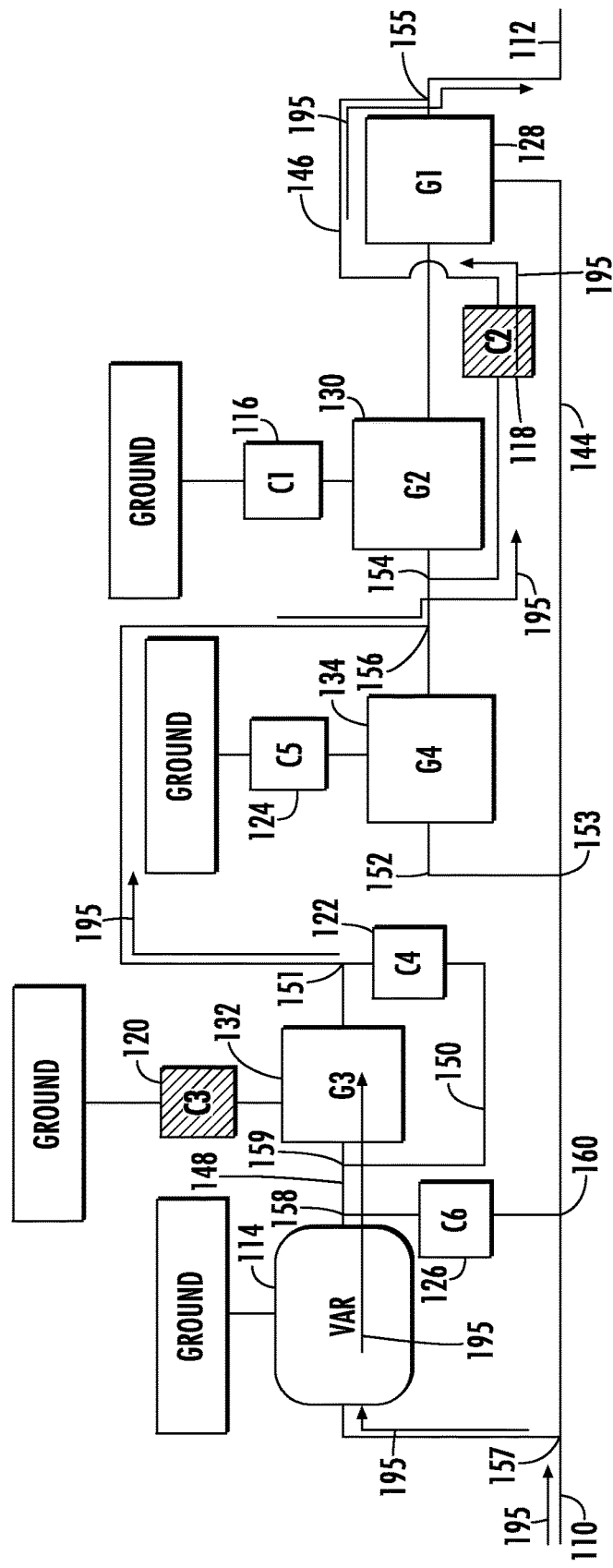
FIG. 13 is a block diagrammatic view of the infinitely variable transmission of FIG. 3 showing power flow therethrough in a third forward operating mode.

Turning now to "Mode 3" of table 194, power flows from the input shaft 110 to the output shaft 112 of the transmission 104 as shown in FIG. 13. Input power 195 (designated by solid arrows) flows from the input shaft 110 to the junction 157 and thereafter to the junction 154 through the variator 114, the junctions 158, 159, 151, 156, and the third gearset 132. From the junction 154, input power 195 flows to the junction 155 and thereafter to the output shaft 112 through the second clutch 118. Input power 195 flowing from the input shaft 110 to the output shaft 112 is not split, recirculated, or reconstituted as shown in FIG. 13.

Figure 14:
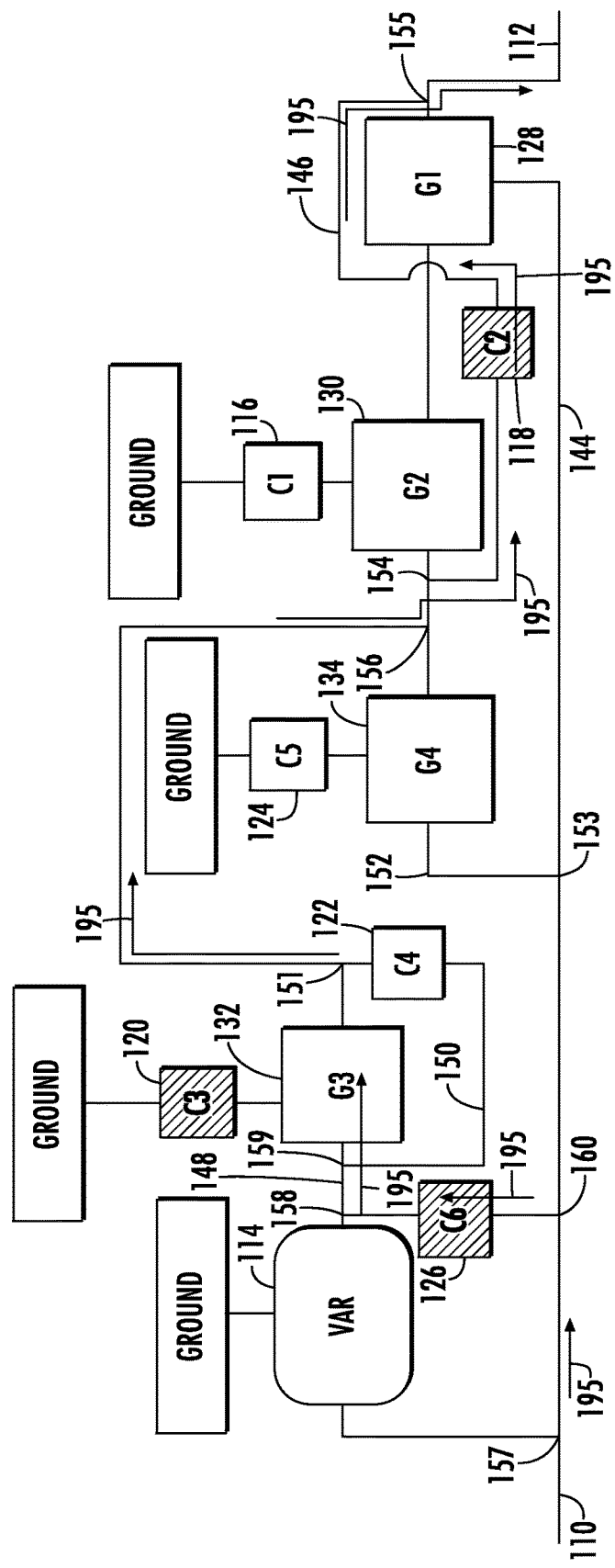
FIG. 14 is a block diagrammatic view of the infinitely variable transmission of FIG. 3 showing power flow therethrough in a third variator bypass operating mode.

Turning now to the "Lock 3" mode of table 194, power flows from the input shaft 110 to the output shaft 112 of the transmission 104 as shown in FIG. 14. Input power 195 (designated by solid arrows) flows from the input shaft 110 to the junction 157 and thereafter to the junction 160 as shown in FIG. 14. Input power 195 is then transmitted from the junction 160 to the junction 154 through the junctions 158, 159, 151, 156, the variator bypass clutch 126, and the third gearset 132 so that the variator 114 receives no power load (i.e., the variator 114 is bypassed). From the junction 154, input power 195 is transmitted to the junction 155 and thereafter to the output shaft 112 through the second clutch 118. Input power 195 flowing from the input shaft 110 to the output shaft 112 is not split, recirculated, or reconstituted as shown in FIG. 14.

Turning now to the "Bypass 3-4" mode of table 194, power flows from the input shaft 110 to the output shaft 112 of the transmission 104 as shown in FIG. 15. Input power 195 (designated by the solid arrows) is transmitted from the input shaft 110 to the junction 153 through the junctions 157, 160 and thereafter to the junction 156 through the fourth gearset 134 so that the variator 114 receives no power load. From the junction 156, input power 195 is transmitted to the junction 155 and thereafter to the output shaft 112 through the second clutch 118 and the junction 154. Input power 195 flowing from the input shaft 110 to the output shaft 112 is not split, recirculated, or reconstituted as shown in FIG. 15.

Figure 16:
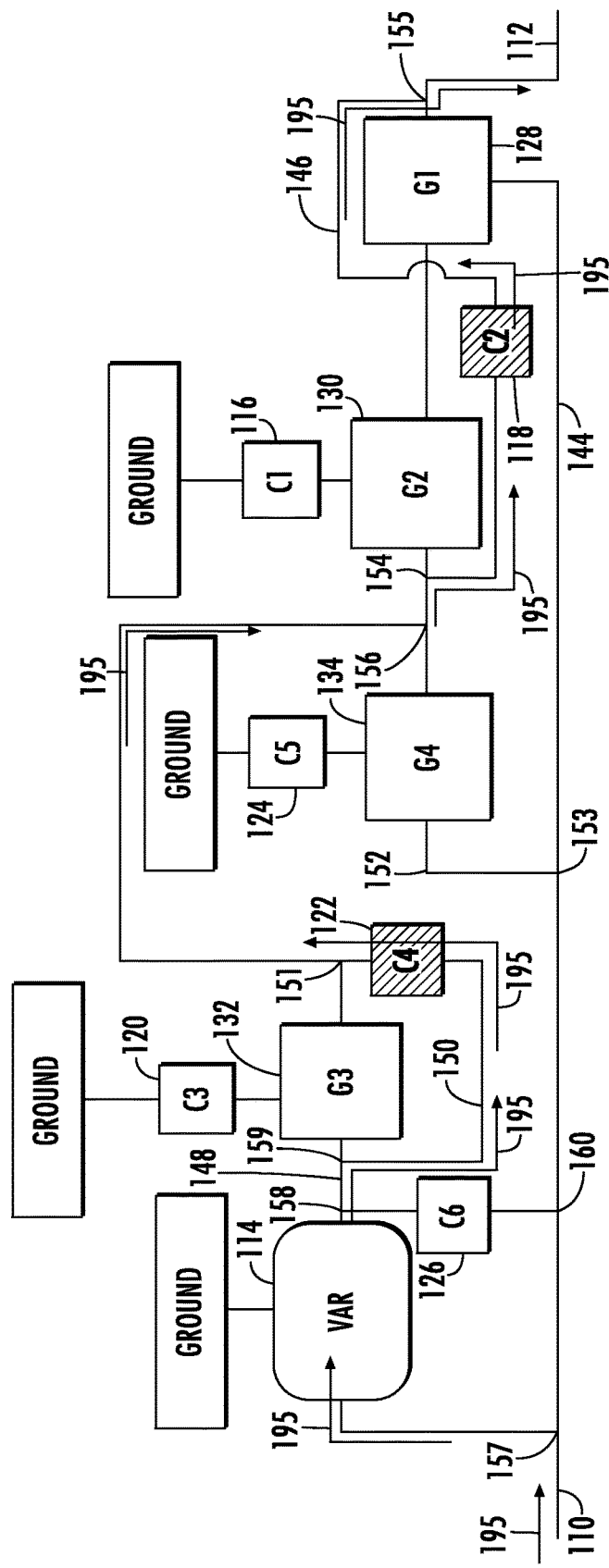
FIG. 16 is a block diagrammatic view of the infinitely variable transmission of FIG. 3 showing power flow therethrough in a fourth forward operating mode.

Turning now to "Mode 4" of table 194, power flows from the input shaft 110 to the output shaft 112 of the transmission 104 as shown in FIG. 16. Input power 195 (designated by the solid arrows) is transmitted from the input shaft 110 to the junction 157 and thereafter to the junction 156 through the variator 114, the fourth clutch 122, and the junctions 158, 159, 151, 156 as shown in FIG. 16. From the junction 156, input power 195 is transmitted to the junction 155 and thereafter to the output shaft 112 through the second clutch 118 and the junction 154. Input power 195 flowing from the input shaft 110 to the output shaft 112 is not split, recirculated, or reconstituted as shown in FIG. 16.

Figure 17:
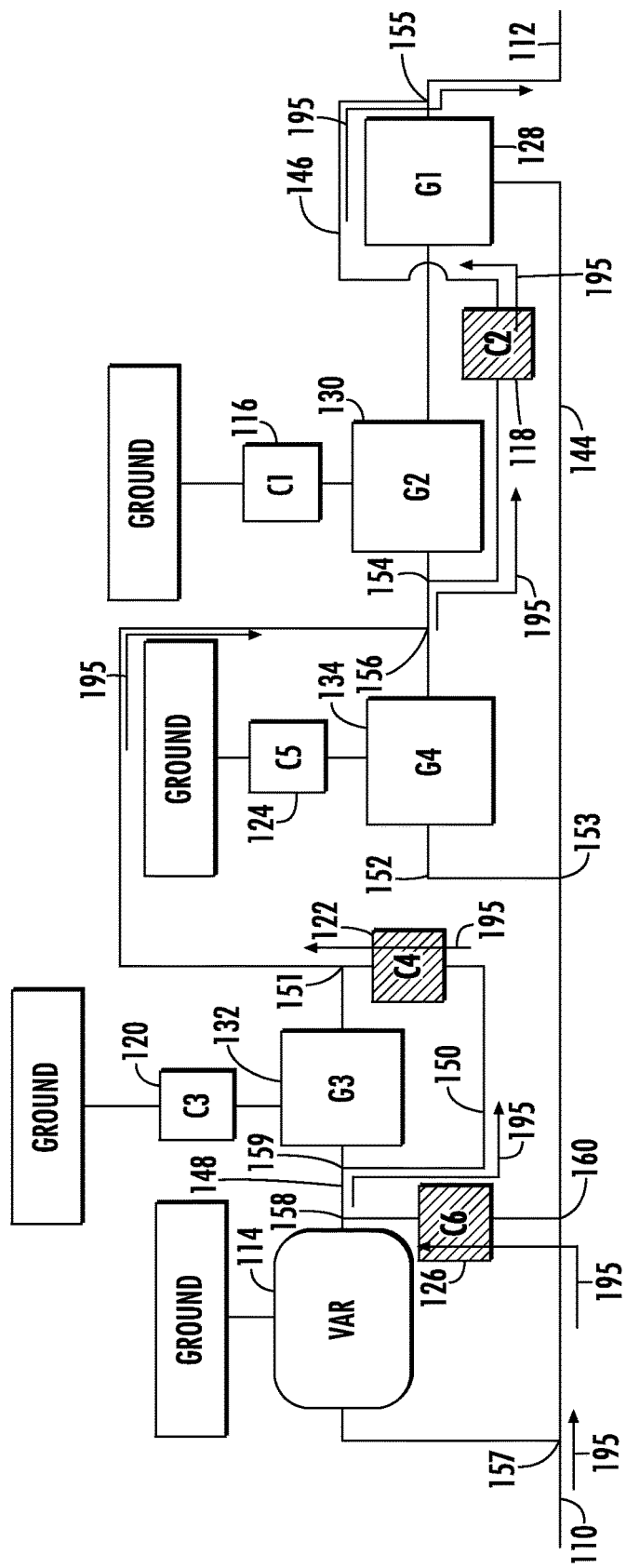
FIG. 17 is a block diagrammatic view of the infinitely variable transmission of FIG. 3 showing power flow therethrough in a fourth variator bypass operating mode.

Turning now to the "Lock 4" mode of table 194, power flows from the input shaft 110 to the output shaft 112 of the transmission 104 as shown in FIG. 17. Input power 195 (designated by the solid arrows) is transmitted from the input shaft 110 to the junction 160 through the junction 157 and thereafter to the junction 156 through the junctions 158, 159, 151, the variator bypass clutch 126, and the fourth clutch 122 so that the variator 114 receives no power load as shown in FIG. 17. From the junction 156, input power 195 is transmitted to the junction 155 and thereafter to the output shaft 112 through the second clutch 118 and the junction 154. Input power 195 flowing from the input shaft 110 to the output shaft 112 is not split, recirculated, or reconstituted as shown in FIG. 17.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A transmission comprising:
an input shaft configured to receive torque from a drive unit,
an output shaft configured to transmit torque to a load,
a variable-ratio unit arranged between the input shaft and the output shaft, and
a plurality of torque transmitting mechanisms arranged between the input shaft and the output shaft, the plurality of torque transmitting mechanisms including a first clutch, a second clutch, a third clutch, and a fourth clutch, the transmission being operable to (i) engage the first clutch and the second clutch in a first operating mode of the transmission and (ii) engage the first clutch and the third clutch in a second operating mode of the transmission,
wherein the transmission is further operable to (i) engage the fourth clutch and disengage the second clutch during a first period of time and (ii) engage the third clutch and disengage the fourth clutch during a second period of time following the first period of time to transition from the first operating mode to the second operating mode.

2. The transmission of claim 1, wherein the second period of time immediately follows the first period of time.

3. The transmission of claim 1, wherein the transmission is operable to engage the first clutch during the first period of time to define a fixed speed ratio between the input shaft and the output shaft during the first period of time.

4. The transmission of claim 3, wherein (i) the transmission is operable to receive a first plurality of input speeds at the input shaft, (ii) the transmission is operable to provide a second plurality of output speeds at the output shaft, and (iii) one of the second plurality of output speeds is equal to zero in the fixed speed ratio for the first plurality of input speeds.

5. The transmission of claim 1, wherein (i) the transmission is operable to receive a first plurality of input speeds at the input shaft, (ii) the transmission is operable to provide a second plurality of output speeds at the output shaft, (iii) the transmission is operable to provide a first range of speed ratios between the first plurality of input speeds and the second plurality of output speeds in the first operating mode, and (iv) the first range of speed ratios include a ratio in which one of the second plurality of output speeds is equal to zero for the first plurality of input speeds.

6. The transmission of claim 5, wherein (i) the transmission is operable to provide a second range of speed ratios between the first plurality of input speeds and the second plurality of output speeds in the second operating mode, and (ii) the second range of speed ratios include a ratio in which one of the second plurality of output speeds is equal to zero for the first plurality of input speeds.

7. The transmission of claim 6, wherein the first range of speed ratios overlap with the second range of speed ratios.

8. The transmission of claim 6, wherein (i) the first range of speed ratios include a plurality of negative speed ratios and a plurality of positive speed ratios, and (ii) the second range of speed ratios include only the ratio and a plurality of positive speed ratios.

9. The transmission of claim 1, further comprising a first planetary gearset, a second planetary gearset, a third planetary gearset, and a fourth planetary gearset.

10. The transmission of claim 1, further comprising only a first planetary gearset, a second planetary gearset, a third planetary gearset, and a fourth planetary gearset.

11. A transmission comprising:
an input shaft configured to receive torque from a drive unit,
an output shaft configured to transmit torque to a load,
a variable-ratio unit arranged between the input shaft and the output shaft, and
a plurality of torque transmitting mechanisms arranged between the input shaft and the output shaft, the plurality of torque transmitting mechanisms including a first clutch, a second clutch, a third clutch, and a fourth clutch, the transmission being operable to (i) engage the first clutch and the second clutch in a first operating mode of the transmission and (ii) engage the first clutch and the third clutch in a second operating mode of the transmission,
wherein the transmission is further operable to (i) engage the fourth clutch and disengage the second clutch to transition from the first operating mode to a third operating mode and (ii) engage the third clutch and disengage the fourth clutch to transition from the third operating mode to the second operating mode.

12. The transmission of claim 11, wherein the plurality of torque transmitting mechanism includes a fifth clutch.

13. The transmission of claim 12, wherein the transmission is operable to (i) engage the third clutch and the fifth clutch in a fourth operating mode of the transmission and (ii) engage the second clutch and the fifth clutch in a fifth operating mode of the transmission.

14. The transmission of claim 13, wherein the transmission is operable to (i) engage the fourth clutch and disengage the third clutch to transition from the fourth operating mode to a sixth operating mode and (ii) engage the second clutch and disengage the fourth clutch to transition from the sixth operating mode to the fifth operating mode.

15. The transmission of claim 14, wherein the transmission is operable to engage the fifth clutch when the fourth clutch is engaged and the third clutch is disengaged to define a fixed speed ratio between the input shaft and the output shaft.

16. The transmission of claim 13, wherein (i) the transmission is operable to receive a first plurality of input speeds at the input shaft, (ii) the transmission is operable to provide a second plurality of output speeds at the output shaft, (iii) the transmission is operable to provide a first range of speed ratios between the first plurality of input speeds and the second plurality of output speeds in the fourth operating mode, (iv) the transmission is operable to provide a second range of speed ratios between the first plurality of input speeds and the second plurality of output speeds in the fifth operating mode, and (v) the first range of speed ratios overlap with the second range of speed ratios.

17. The transmission of claim 11, further comprising a first planetary gearset, a second planetary gearset, a third planetary gearset, and a fourth planetary gearset.

18. The transmission of claim 11, further comprising only a first planetary gearset, a second planetary gearset, a third planetary gearset, and a fourth planetary gearset.

19. The transmission of claim 18, further comprising a housing, wherein at least three of the clutches are engageable to couple an element of one of the planetary gearsets to the housing.

20. A method for operating a transmission, the transmission including an input shaft, an output shaft, a variable-ratio unit arranged between the input shaft and the output shaft, and a plurality of clutches arranged between the input shaft and the output shaft, the method comprising:
engaging a first clutch and a second clutch in a first operating mode to transmit torque received at the input shaft from the input shaft to the output shaft in the first operating mode,
engaging a fourth clutch and disengaging the second clutch to transition from the first operating mode to a second operating mode and to prevent torque received at the input shaft from being transmitted through the variable-ratio unit to the output shaft in the second operating mode, and
engaging a third clutch and disengaging the fourth clutch to transition from the second operating mode to a third operating mode to transmit torque received at the input shaft from the input shaft to the output shaft in the third operating mode.

21. The method of claim 20, further comprising (i) operating the variable-ratio to output a first torque ratio in the first operating mode, (ii) adjusting the variable-ratio unit to change the torque ratio output from the variable-ratio unit in the second operating mode, and (iii) operating the variable-ratio unit to output a second torque ratio in the third operating mode, the first torque ratio being different from the second torque ratio.

* * * * *